US012114394B2

(12) United States Patent
Wang et al.

(10) Patent No.: US 12,114,394 B2
(45) Date of Patent: Oct. 8, 2024

(54) MULTIPLE ACTIVE-COORDINATION-SET AGGREGATION FOR MOBILITY MANAGEMENT

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 488 days.

(21) Appl. No.: 17/295,815

(22) PCT Filed: Dec. 31, 2019

(86) PCT No.: PCT/US2019/069129
§ 371 (c)(1),
(2) Date: May 20, 2021

(87) PCT Pub. No.: WO2020/142532
PCT Pub. Date: Jul. 9, 2020

(65) Prior Publication Data
US 2022/0030414 A1 Jan. 27, 2022

Related U.S. Application Data

(60) Provisional application No. 62/787,710, filed on Jan. 2, 2019.

(51) Int. Cl.
*H04W 8/08* (2009.01)
*H04W 36/00* (2009.01)
*H04W 36/18* (2009.01)

(52) U.S. Cl.
CPC ......... *H04W 8/08* (2013.01); *H04W 36/0069* (2018.08); *H04W 36/18* (2013.01)

(58) Field of Classification Search
CPC .......................... H04W 8/08; H04W 36/0069
See application file for complete search history.

(56) References Cited

U.S. PATENT DOCUMENTS 6,038,448 A 3/2000 Chheda et al.
6,665,521 B1 12/2003 Gorday et al.
(Continued)

FOREIGN PATENT DOCUMENTS

CN 101764634 6/2010
CN 101867451 10/2010
(Continued)

OTHER PUBLICATIONS

"Foreign Office Action", IN Application No. 202147024718, Feb. 28, 2022, 5 pages.
(Continued)

*Primary Examiner* — Barry W Taylor
(74) *Attorney, Agent, or Firm* — Colby Nipper PLLC

(57) ABSTRACT

This document describes aspects of multiple active-coordination-set (ACS) aggregation for mobility management. A master base station coordinates aggregation of control-plane and user-plane communications, generated by a first active-coordination-set for a first joint communication between the first ACS and a user equipment, where the first ACS includes the master base station and at least a second base station. The master base station receives, from a second master base station of a second ACS, control-plane information or user-plane data associated with a second joint communication between the second ACS and the UE, the second ACS including the second master base station and at least a third base station. The master base station aggregates the control-plane and user-plane communications with at least a portion of the control-plane information or the user-plane data to coordinate data throughput to the user equipment.

20 Claims, 11 Drawing Sheets

(56) References Cited

U.S. PATENT DOCUMENTS

| | | |
|---|---|---|
| 6,898,430 B1 | 5/2005 | Liberti et al. |
| 8,023,463 B2 | 9/2011 | Dick et al. |
| 8,315,629 B2 | 11/2012 | Pamp et al. |
| 8,483,184 B2 | 7/2013 | Yokoyama et al. |
| 8,665,806 B2 | 3/2014 | Wang et al. |
| 8,706,156 B2 | 4/2014 | Han et al. |
| 8,989,125 B1* | 3/2015 | Marupaduga ........ H04B 7/024 455/67.11 |
| 9,008,678 B2 | 4/2015 | Schoenerstedt |
| 9,036,613 B2 | 5/2015 | Bleugels et al. |
| 9,100,095 B2 | 8/2015 | Mantri |
| 9,210,550 B2 | 12/2015 | Koc et al. |
| 9,253,783 B2 | 2/2016 | Wang et al. |
| 9,344,159 B2 | 5/2016 | Zhuang |
| 9,374,772 B2 | 6/2016 | Daoud |
| 9,380,533 B2 | 6/2016 | Chung et al. |
| 9,674,863 B2 | 6/2017 | Cheng et al. |
| 9,743,329 B2* | 8/2017 | Xiao ........................ H04B 7/24 |
| 9,780,842 B2 | 10/2017 | Boudreau et al. |
| 9,941,939 B2 | 4/2018 | Parl et al. |
| 9,985,750 B2 | 5/2018 | Maaref et al. |
| 10,045,376 B2 | 8/2018 | Yang et al. |
| 10,218,422 B2 | 2/2019 | Raghavan et al. |
| 10,313,950 B2 | 6/2019 | Choi et al. |
| 10,321,414 B2 | 6/2019 | Guo et al. |
| 10,412,691 B1 | 9/2019 | Marupaduga et al. |
| 10,476,577 B1 | 11/2019 | Wang et al. |
| 10,834,645 B2 | 11/2020 | Wang et al. |
| 10,893,572 B2 | 1/2021 | Wang et al. |
| 11,224,081 B2 | 1/2022 | Wang et al. |
| 11,375,527 B1 | 6/2022 | Eyuboglu et al. |
| 11,804,877 B2 | 10/2023 | Wang et al. |
| 2003/0002460 A1 | 1/2003 | English |
| 2004/0203973 A1 | 10/2004 | Khan |
| 2006/0013185 A1 | 1/2006 | Seo et al. |
| 2006/0116156 A1 | 6/2006 | Haseba et al. |
| 2006/0128312 A1 | 6/2006 | Declerck et al. |
| 2006/0203731 A1 | 9/2006 | Tiedemann et al. |
| 2009/0176494 A1 | 7/2009 | Lee et al. |
| 2010/0027487 A1 | 2/2010 | Ihm et al. |
| 2010/0103983 A1 | 4/2010 | Wang et al. |
| 2010/0118752 A1 | 5/2010 | Suzuki et al. |
| 2010/0142462 A1 | 6/2010 | Wang et al. |
| 2010/0173660 A1 | 7/2010 | Liu et al. |
| 2010/0210246 A1 | 8/2010 | Yang et al. |
| 2011/0080893 A1 | 4/2011 | Fong et al. |
| 2011/0096751 A1 | 4/2011 | Ma et al. |
| 2011/0124294 A1 | 5/2011 | Dwyer et al. |
| 2011/0158117 A1 | 6/2011 | Ho et al. |
| 2011/0281585 A1 | 11/2011 | Kwon et al. |
| 2012/0033571 A1 | 2/2012 | Shimezawa et al. |
| 2012/0083309 A1 | 4/2012 | Kwon et al. |
| 2012/0087273 A1 | 4/2012 | Koo et al. |
| 2012/0120821 A1 | 5/2012 | Kazmi et al. |
| 2012/0157139 A1 | 6/2012 | Noh et al. |
| 2012/0178462 A1 | 7/2012 | Kim |
| 2012/0218968 A1 | 8/2012 | Kim et al. |
| 2012/0264443 A1 | 10/2012 | Ng et al. |
| 2013/0034136 A1 | 2/2013 | Park et al. |
| 2013/0039287 A1 | 2/2013 | Rayavarapu et al. |
| 2013/0053045 A1 | 2/2013 | Chuang |
| 2013/0053079 A1 | 2/2013 | Kwun et al. |
| 2013/0089058 A1 | 4/2013 | Yang et al. |
| 2013/0107848 A1 | 5/2013 | Kang et al. |
| 2013/0122918 A1 | 5/2013 | Boley et al. |
| 2013/0130684 A1 | 5/2013 | Gomes et al. |
| 2013/0150106 A1 | 6/2013 | Bucknell et al. |
| 2013/0182628 A1 | 7/2013 | Gholmieh et al. |
| 2013/0225184 A1 | 8/2013 | Liu et al. |
| 2013/0242787 A1 | 9/2013 | Sun et al. |
| 2013/0244682 A1 | 9/2013 | Schoenerstedt |
| 2014/0010131 A1 | 1/2014 | Gaal et al. |
| 2014/0112184 A1 | 4/2014 | Chai |
| 2014/0127991 A1 | 5/2014 | Lim et al. |
| 2014/0148168 A1 | 5/2014 | Aoyagi et al. |
| 2014/0169201 A1 | 6/2014 | Tamura et al. |
| 2014/0169261 A1 | 6/2014 | Ming et al. |
| 2014/0274081 A1 | 9/2014 | Comeau et al. |
| 2014/0287759 A1 | 9/2014 | Purohit |
| 2014/0348104 A1 | 11/2014 | Morita |
| 2014/0376478 A1 | 12/2014 | Morita |
| 2015/0038083 A1 | 2/2015 | Patro et al. |
| 2015/0065148 A1 | 3/2015 | De Pasquale et al. |
| 2015/0098397 A1 | 4/2015 | Damnjanovic et al. |
| 2015/0139197 A1 | 5/2015 | He et al. |
| 2015/0139203 A1 | 5/2015 | Miryala et al. |
| 2015/0163822 A1 | 6/2015 | Guo et al. |
| 2015/0195795 A1 | 7/2015 | Loehr et al. |
| 2015/0244429 A1* | 8/2015 | Zhang ................... H04B 7/024 370/329 |
| 2015/0244489 A1 | 8/2015 | Wang |
| 2015/0288427 A1 | 10/2015 | Wang et al. |
| 2015/0326282 A1 | 11/2015 | Futaki |
| 2015/0373730 A1 | 12/2015 | Fujishiro et al. |
| 2016/0021526 A1 | 1/2016 | Niu et al. |
| 2016/0021623 A1 | 1/2016 | Guo et al. |
| 2016/0028448 A1 | 1/2016 | Park et al. |
| 2016/0037511 A1 | 2/2016 | Vincze et al. |
| 2016/0044634 A1 | 2/2016 | Seo et al. |
| 2016/0057663 A1 | 2/2016 | Teyeb et al. |
| 2016/0128123 A1 | 5/2016 | Li |
| 2016/0174278 A1 | 6/2016 | Gao et al. |
| 2016/0192420 A1 | 6/2016 | Kim et al. |
| 2016/0192433 A1 | 6/2016 | Deenoo et al. |
| 2016/0219475 A1 | 7/2016 | Kim |
| 2016/0323832 A1 | 11/2016 | Love et al. |
| 2016/0374026 A1 | 12/2016 | Dinan |
| 2017/0070931 A1 | 3/2017 | Huang et al. |
| 2017/0078333 A1 | 3/2017 | Tevlin |
| 2017/0105147 A1 | 4/2017 | Jiang et al. |
| 2017/0148173 A1 | 5/2017 | Kosmecki et al. |
| 2017/0164252 A1 | 6/2017 | Chaudhuri et al. |
| 2017/0188406 A1 | 6/2017 | Baligh et al. |
| 2017/0230986 A1 | 8/2017 | Moon et al. |
| 2017/0238271 A1* | 8/2017 | Viorel .................... H04B 7/024 370/350 |
| 2017/0250786 A1 | 8/2017 | Better et al. |
| 2017/0272345 A1 | 9/2017 | Viorel et al. |
| 2017/0289893 A1 | 10/2017 | Manna et al. |
| 2017/0290030 A1 | 10/2017 | Wang et al. |
| 2017/0332389 A1 | 11/2017 | Sun et al. |
| 2017/0339530 A1 | 11/2017 | Maaref |
| 2017/0347277 A1 | 11/2017 | Zhang et al. |
| 2017/0359759 A1 | 12/2017 | Brown et al. |
| 2018/0013533 A1 | 1/2018 | Yang et al. |
| 2018/0062770 A1 | 3/2018 | Reial et al. |
| 2018/0152951 A1 | 5/2018 | Zhuang et al. |
| 2018/0213450 A1 | 7/2018 | Futaki et al. |
| 2018/0219667 A1 | 8/2018 | Zhao et al. |
| 2018/0220403 A1 | 8/2018 | Wilson et al. |
| 2018/0235020 A1 | 8/2018 | Maaref |
| 2018/0270895 A1 | 9/2018 | Park et al. |
| 2018/0352511 A1 | 12/2018 | Martin et al. |
| 2019/0028348 A1 | 1/2019 | Chai |
| 2019/0053235 A1 | 2/2019 | Novlan et al. |
| 2019/0075604 A1 | 3/2019 | Wang et al. |
| 2019/0081657 A1 | 3/2019 | Zeng et al. |
| 2019/0082331 A1 | 3/2019 | Raghavan et al. |
| 2019/0132882 A1 | 5/2019 | Li et al. |
| 2019/0165843 A1 | 5/2019 | Wu et al. |
| 2019/0174346 A1 | 6/2019 | Murray et al. |
| 2019/0174472 A1 | 6/2019 | Lee et al. |
| 2019/0215048 A1 | 7/2019 | Cirik et al. |
| 2019/0253106 A1 | 8/2019 | Raghavan et al. |
| 2019/0312616 A1 | 10/2019 | Christoffersson et al. |
| 2019/0363843 A1 | 11/2019 | Gordaychik |
| 2020/0015192 A1 | 1/2020 | Chun |
| 2020/0022043 A1 | 1/2020 | Pelletier et al. |
| 2020/0022174 A1 | 1/2020 | Karaki et al. |
| 2020/0145061 A1 | 5/2020 | Black et al. |
| 2020/0154442 A1 | 5/2020 | Zhou |
| 2020/0178131 A1 | 6/2020 | Wang et al. |
| 2020/0187281 A1 | 6/2020 | Wang et al. |
| 2020/0196388 A1* | 6/2020 | Zhang ................... H04B 7/024 |

(56) References Cited

U.S. PATENT DOCUMENTS

| | | |
|---|---|---|
| 2020/0220603 A1 | 7/2020 | Hao et al. |
| 2020/0329503 A1 | 10/2020 | Da Silva et al. |
| 2020/0374970 A1 | 11/2020 | Wang et al. |
| 2020/0396763 A1 | 12/2020 | Lee et al. |
| 2021/0028978 A1 | 1/2021 | Zhou et al. |
| 2021/0029516 A1 | 1/2021 | Wang et al. |
| 2021/0068123 A1 | 3/2021 | Zhu et al. |
| 2021/0385903 A1 | 12/2021 | Wang et al. |
| 2021/0391897 A1 | 12/2021 | Wang et al. |
| 2022/0006493 A1 | 1/2022 | Wang et al. |
| 2022/0007363 A1 | 1/2022 | Wang et al. |
| 2022/0038985 A1* | 2/2022 | Deenoo ................ H04W 36/32 |
| 2022/0110181 A1 | 4/2022 | Miao |
| 2022/0311577 A1 | 9/2022 | Matsummura et al. |

FOREIGN PATENT DOCUMENTS

| | | |
|---|---|---|
| CN | 102474743 | 5/2012 |
| CN | 103959672 | 7/2014 |
| CN | 104067660 | 9/2014 |
| CN | 105873124 | 8/2016 |
| CN | 106879051 | 6/2017 |
| CN | 107431962 | 12/2017 |
| CN | 107736048 | 2/2018 |
| CN | 107872889 | 4/2018 |
| CN | 108140035 | 6/2018 |
| EP | 2282413 | 2/2011 |
| EP | 2809104 | 12/2014 |
| EP | 2953393 | 12/2015 |
| EP | 3282786 | 2/2018 |
| EP | 3701638 | 9/2020 |
| WO | 0237771 | 5/2002 |
| WO | 2008147654 | 12/2008 |
| WO | 2011140715 | 11/2011 |
| WO | 2012114151 | 8/2012 |
| WO | 2013091229 | 6/2013 |
| WO | 2014074919 | 5/2014 |
| WO | 2014179958 | 11/2014 |
| WO | 2015074270 | 5/2015 |
| WO | 2015163798 | 10/2015 |
| WO | 2016081375 | 5/2016 |
| WO | 2016191091 | 12/2016 |
| WO | 2017117340 | 7/2017 |
| WO | 2017148173 | 9/2017 |
| WO | 2018004278 | 1/2018 |
| WO | 2018010818 | 1/2018 |
| WO | 2018020015 | 2/2018 |
| WO | 2018031770 | 2/2018 |
| WO | 2018073485 | 4/2018 |
| WO | 2018130115 | 7/2018 |
| WO | 2018169343 | 9/2018 |
| WO | 2018202797 | 11/2018 |
| WO | 2018202798 | 11/2018 |
| WO | 2019001039 | 1/2019 |
| WO | 2019016141 | 1/2019 |
| WO | 2019038700 | 2/2019 |
| WO | 2018025789 | 5/2019 |
| WO | 2020112680 | 6/2020 |
| WO | 2020113010 | 6/2020 |
| WO | 2020117558 | 6/2020 |
| WO | 2020139811 | 7/2020 |
| WO | 2020142532 | 7/2020 |
| WO | 2020159773 | 8/2020 |
| WO | 2020172022 | 8/2020 |
| WO | 2020172372 | 8/2020 |
| WO | 2020186097 | 9/2020 |
| WO | 2020236429 | 11/2020 |
| WO | 2021015774 | 1/2021 |
| WO | 2021029879 | 2/2021 |
| WO | 2021054963 | 3/2021 |
| WO | 2021054964 | 3/2021 |
| WO | 2021236510 | 11/2021 |
| WO | 2022133957 | 6/2022 |
| WO | 2022151128 | 7/2022 |
| WO | 2022186815 | 9/2022 |
| WO | 2023115058 | 6/2023 |

OTHER PUBLICATIONS

"Foreign Office Action", IN Application No. 202147017729, Mar. 9, 2022, 6 pages.

"Foreign Office Action", IN Application No. 202147025618, Mar. 11, 2022, 5 pages.

Buzzi, et al., "RIS Configuration, Beamformer Design, and Power Control in Single-Cell and Multi-Cell Wireless Networks", Jun. 2021, pp. 398-411.

Mustaghfirin, et al., "Performance Analysis of Intelligent Reflecting Surface-Assisted Multi-Users Communication Networks", Aug. 2021, 16 pages.

Yifei, et al., "Recent Progress in Research and Development of Reconfigurable Intelligent Surface", Mar. 2022, 11 pages.

"Foreign Office Action", CN Application No. 201980082695.3, Aug. 31, 2023, 25 pages.

"Notice of Allowance", U.S. Appl. No. 17/287,898, filed Jun. 26, 2023, 12 pages.

"Notice of Allowance", U.S. Appl. No. 17/275,632, filed Aug. 22, 2023, 7 pages.

"Foreign Office Action", CN Application No. 201980069427.8, Oct. 18, 2021, 12 pages.

"Notice of Allowance", U.S. Appl. No. 16/210,969, filed Oct. 26, 2021, 5 pages.

"Extended European Search Report", EP Application No. 22194393.9, Jan. 26, 2023, 6 pages.

"Foreign Office Action", EP Application No. 19827946.5, Feb. 24, 2023, 7 pages.

"Foreign Office Action", EP Application No. 19845895.2, Dec. 13, 2022, 7 pages.

"Foreign Office Action", EP Application No. 19842524.1, May 11, 2023, 22 pages.

"International Search Report and Written Opinion", Application No. PCT/US2022/081918, Jun. 20, 2023, 20 pages.

"Invitation to Pay Additional Fees and Partial Search Report", Application No. PCT/US2022/081918, Apr. 19, 2023, 12 pages.

Hua, Meng, et al., "Intelligent Reflecting Surface-Aided Joint Processing Coordinated Multipoint Transmission", Dec. 3, 2020, 16 pages.

Nemati, Mahyar, "Modeling RIS Empowered Outdoor-to-Indoor Communication in mmWave Cellular Networks", Nov. 2021, 14 pages.

"3GPP TS 24.501 V16.3.0", 3GPP TS 24.501 version 16.3.0, Dec. 2019, 645 pages.

"3GPP TSG RAN WG4 25.942 V2.0.0: "RF System Scenarios"", TSG RAN Working Group 4 (Radio) Meeting #8, Oct. 1999, 65 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"5G; Study on New Radio (NR) Access Technology", ETSI TR 138 912; V14.0.0; Technical Report; 3GPP TR 38.912 version 14.0.0 Release 14, May 2017, 77 pages.

"Beam Management and Beam Reporting", 3GPP TSG RAN WG1 Meeting #88bis, R1-1704488, Spokane, Washington, USA Apr. 3-7, 2017, 7 pages.

"Corrected Notice of Allowance", U.S. Appl. No. 16/419,854, filed Dec. 16, 2020, 2 pages.

"Discussion on HARQ Management and HARQ-ACK Feedback", 3GPP TSG RAN WG1 Meeting #91, R1-1720203, Reno, USA, Nov. 27-Dec. 1, 2017, 5 pages.

"Discussion on NR Beamforming with UE-Group-Specific Beam Sweeping", 3GPP TSG-RAN WG1 Meeting #86 R1-166219; Gothenburg, Sweden, Aug. 22-26, 2016, 7 pages.

(56) References Cited

OTHER PUBLICATIONS

"Final Office Action", U.S. Appl. No. 16/210,969, filed Jan. 7, 2021, 17 pages.
"International Preliminary Report on Patentability", Application No. PCT/US2019/069129, Apr. 7, 2021, 14 pages.
"International Preliminary Report on Patentability", PCT Application No. PCT/US2019/068265, Jan. 18, 2021, 31 pages.
"International Preliminary Report on Patentability", Application No. PCT/US2019/068265, Jan. 18, 2021, 33 pages.
"International Preliminary Report on Patentability", Application No. PCT/US2019/051980, Dec. 8, 2020, 7 pages.
"International Preliminary Report on Patentability", Application No. PCT/US2019/063240, Feb. 18, 2021, 8 pages.
"International Search Report and Written Opinion", Application No. PCT/US2019/051980, Jul. 27, 2020, 19 pages.
"International Search Report and Written Opinion", PCT Application No. PCT/US2019/043355, Mar. 31, 2020, 12 pages.
"International Search Report and Written Opinion", PCT Application No. PCT/US2020/014638, May 13, 2020, 12 pages.
"International Search Report and Written Opinion", Application No. PCT/US2020/045777, Oct. 9, 2020, 13 pages.
"International Search Report and Written Opinion", PCT Application No. PCT/US2019/069129, Mar. 31, 2020, 13 pages.
"International Search Report and Written Opinion", PCT Application No. PCT/US2019/046374, Apr. 14, 2020, 13 pages.
"International Search Report and Written Opinion", PCT Application No. PCT/US2020/022460, May 26, 2020, 13 pages.
"International Search Report and Written Opinion", Application No. PCT/US2020/031716, Jul. 20, 2020, 14 pages.
"International Search Report and Written Opinion", PCT Application No. PCT/US2019/063081, Feb. 21, 2020, 14 pages.
"International Search Report and Written Opinion", PCT Application No. PCT/US2019/063620, Mar. 9, 2020, 14 pages.
"International Search Report and Written Opinion", PCT Application No. PCT/US2019/052005, May 18, 2020, 14 pages.
"International Search Report and Written Opinion", PCT Application No. PCT/US2020/017930, May 29, 2020, 14 pages.
"International Search Report and Written Opinion", PCT Application No. PCT/US2019/063240, Feb. 13, 2020, 16 pages.
"International Search Report and Written Opinion", PCT Application No. PCT/US2019/068265, Apr. 29, 2020, 29 pages.
"Invitation to Pay Additional Fees", PCT Application No. PCT/US2019/051980, Jun. 4, 2020, 10 pages.
"Invitation to Pay Additional Fees", PCT Application No. PCT/US2019/068265, Mar. 13, 2020, 13 pages.
"LTE; Evolved Universal Terrestrial Radio Access (E-UTRA) and Evolved Universal Terrestrial Radio Access Network (E-UTRAN); Overall Description; Stage 2 (3GPP TS 36.300 version 15.3.0 Release 15)", ETSI TS 136 300 V15.3.0, Oct. 2018, 366 pages.
"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0, Jan. 2020, 137 pages.
"Non-Final Office Action", U.S. Appl. No. 16/210,969, filed Jul. 23, 2020, 15 Pages.
"Non-Final Office Action", U.S. Appl. No. 16/419,854, filed Jun. 30, 2020, 29 Pages.
"Notice of Allowance", U.S. Appl. No. 16/206,579, filed Jul. 8, 2020, 10 Pages.
"Notice of Allowance", U.S. Appl. No. 16/419,854, filed Nov. 5, 2020, 11 pages.
"On the Need for More Flexible Configurations Related to CSI Reporting", 3GPP TSG RAN WG1 Meeting #87, R1-1611237, Reno, USA, Nov. 14-18, 2016, 6 pages.
"Supplemental Notice of Allowance", U.S. Appl. No. 16/206,579, filed Sep. 30, 2020, 3 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
"U.S. Appl. No. 62/785,949", filed Feb. 21, 2019.
"U.S. Appl. No. 62/785,949", filed Dec. 28, 2018.
"UE Overheating for EN-DC", 3GPP R2-1802414, UE overheating for EN-DC, in 3GPP TSG-RAN WG2 Meeting #101, Apple Inc., Mar. 2, 2018, 3 pages.
"Universal Mobile Telecommunications System (UMTS); Automatic Neighbour Relation (ANR) for UTRAN", 3GPP TS 25.484 version 10.0.1 Release 10, Jan. 2012, 21 pages.
"Universal Mobile Telecommunications System (UMTS); Automatic Neighbour Relation (ANR) for UTRAN", 3GPP TS 25.484 version 11.0.0 Release 11, Jan. 2012, 22 pages.
"Written Opinion", Application No. PCT/US2019/063240, Oct. 27, 2020, 10 pages.
"Written Opinion", Application No. PCT/US2019/068265, Sep. 25, 2020, 20 pages.
"Written Opinion", Application No. PCT/US2020/014638, Nov. 26, 2020, 5 pages.
"Written Opinion", PCT Application No. PCT/US2020/031716, Mar. 25, 2021, 6 pages.
"Written Opinion", PCT Application No. PCT/US2019/069129, Dec. 14, 2020, 7 pages.
Aboba, B. et al., "Extensible Authentication Protocol (EAP)", RFC Editor; Retrieved from https://www.rfc-editor.org/info/rfc3748, Jun. 2004, 67 pages.
Gorcin, Ali et al., "Hybrid Automatic Neighbor Relations for 5G Wireless Networks", 2017, 6 pages.
Klingenbrunn, Thomas et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.
Lin, Roy et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, Harrison J. "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
Wu, Chih-Hsiang "Handling Overheating in a Wireless-Communication Device", Technical Disclosure Commons; Retrieved from https://www.tdcommons.org/dpubs_series/2343, Jul. 12, 2019, 22 pages.
Zhang, Jinfang et al., "PoC of SCMA-Based Uplink Grant-Free Transmission in UCNC for 5G", IEEE Journal on Selected Areas in Communications, vol. 35, No. 6, Jun. 2017, 10 pages.
Zhang, Jinyu et al., "Grant-less Uplink Transmission for LTE Operated in Unlicensed Spectrum", Feb. 14, 2018, 6 pages.
"International Preliminary Report on Patentability", Application No. PCT/US2019/063620, May 25, 2021, 8 pages.
"International Preliminary Report on Patentability", Application No. PCT/US2019/063081, May 25, 2021, 9 pages.
"International Preliminary Report on Patentability", Application No. PCT/US2020/014638, Jul. 27, 2021, 7 pages.
"Non-Final Office Action", U.S. Appl. No. 16/210,969, filed Jun. 24, 2021, 19 pages.
"Foreign Office Action", AU Application No. 20200216095, May 2, 2022, 7 pages.
"Foreign Office Action", IN Application No. 202147026024, Jun. 3, 2022, 7 pages.
"Foreign Office Action", IN Application No. 202247010266, Jul. 20, 2022, 7 pages.
"Foreign Office Action", CN Application No. 201980083468.2, Sep. 21, 2023, 11 pages.
"Non-Final Office Action", U.S. Appl. No. 17/292,641, filed Sep. 28, 2023, 10 pages.
"Non-Final Office Action", U.S. Appl. No. 17/311,996, filed Sep. 28, 2023, 8 pages.
"Report of e-mail discussion [95#30] Capability coordination for NR and LTE", 3GPP TSG-RAN WG2 Meeting #95bis—R2-167065, Oct. 2016, 40 pages.
"Updates for M2AP baseline CR for MBMS congestion management", 3GPP TSG RAN WG3 Meeting #87—R3-150291, Feb. 2015, 4 pages.

(56) References Cited

OTHER PUBLICATIONS

"Final Office Action", U.S. Appl. No. 17/292,641, filed Feb. 1, 2024, 10 pages.
"Final Office Action", U.S. Appl. No. 17/311,996, filed Feb. 20, 2024, 9 pages.
"Final Office Action", U.S. Appl. No. 17/292,641, filed Feb. 9, 2024, 10 pages.
"Foreign Office Action", CN Application No. 201980082695.3, Jan. 20, 2024, 8 pages.
"Foreign Office Action", AU Application No. 2023202260, Apr. 2, 2024, 6 pages.
"Non-Final Office Action", U.S. Appl. No. 17/292,641, filed Jun. 18, 2024, 12 pages.

* cited by examiner

MULTIPLE ACTIVE-COORDINATION-SET AGGREGATION FOR MOBILITY MANAGEMENT

RELATED APPLICATION(S)

This application is a national stage entry of International Application No. PCT/US2019/069129, filed Dec. 31, 2019, which claims the benefit of U.S. Provisional Application No. 62/787,710, filed Jan. 2, 2019, the disclosures which are incorporated herein by reference in their entirety.

BACKGROUND

The evolution of wireless communication to fifth generation (5G) and sixth generation (6G) standards and technologies provides higher data rates and greater capacity, with improved reliability and lower latency, which enhances mobile broadband services. 5G and 6G technologies also provide new classes of services for vehicular, fixed wireless broadband, and the Internet of Things (IoT).

A unified air interface, which utilizes licensed, unlicensed, and shared license radio spectrum, in multiple frequency bands, is one aspect of enabling the capabilities of 5G and 6G systems. The 5G and 6G air interface utilizes radio spectrum in bands below 1 GHz (sub-gigahertz), below 6 GHz (sub-6 GHz), and above 6 GHz. Radio spectrum above 6 GHz includes millimeter wave (mmWave) frequency bands that provide wide channel bandwidths to support higher data rates for wireless broadband.

To increase data rates, throughput, and reliability for a user equipment, various forms of wireless connectivity that use multiple radio links between base stations and the user equipment are supported in 5G and 6G systems. Techniques such as dual connectivity or coordinated multipoint communications, often coupled with beamformed signals, can improve data rates, throughput, and reliability, especially at the edge of cells. The use of these radio link configurations increases the complexity of mobility management to maintain high data rates and reliability for the user equipment.

Conventional mobility management techniques are based on base station neighbor relationships and use handovers to maintain connectivity for the user equipment. However, conventional handover techniques based on base station neighbor relationships disconnect radio bearers and establish new bearers during a handover, which can interrupt data communication for the user equipment during the handover, which affects data throughput and latency for the user equipment.

SUMMARY

Using conventional handover techniques for mobility management in 5G and 6G systems may result in inefficiencies due to interruptions in data communication for a user equipment (UE). For example, the interruptions are generally based on disconnection of radio bearers and establishment of new bearers during the handover, which affects data throughput and latency for the UE.

Seamless mobility for wireless communication between the UE and one or more base stations can be supported by an active coordination set (ACS) for each UE. This mobility is enhanced by using a multiple-ACS configuration that aggregates data throughput for the UE. Multiple ACSs are configured for a UE such that each ACS corresponds to a different carrier or radio access technology (RAT) for the same UE. Alternatively or in addition, the ACSs are directionally defined for the UE such that one ACS is configured only for uplink data and another ACS is configured only for downlink data. Each ACS includes a master base station. The master base stations of the different ACSs coordinate the aggregation of the data throughput for the UE. Accordingly, the techniques described herein include multiple ACS aggregation for mobility management.

In implementations of multiple ACS aggregation for mobility management, a master base station coordinates aggregation of control-plane and user-plane communications, generated by a first active-coordination-set (ACS) for a first joint communication between the first ACS and a user equipment (UE) where the first ACS includes the master base station and at least a second base station. The master base station also receives, from a second master base station of a second ACS, control-plane information or user-plane data associated with a second joint communication between the second ACS and the UE, the second ACS including the second master base station and at least a third base station. In implementations, the master base station aggregates the control-plane and user-plane communications generated by the first ACS with at least a portion of the control-plane information or the user-plane data from the second master base station to coordinate data throughput to the user equipment.

Aspects of multiple ACS aggregation for mobility management include a UE processing a first set of joint communications exchanged with a first set of two or more base stations included in a first ACS using a first carrier of a first radio access technology. The UE also processes a second set of joint communications exchanged with a second set of two or more base stations included in a second ACS using a second carrier that is different than the first carrier. In implementations, the second set of joint communications are coordinated with the first set of joint communications, such as by the first ACS coordinating with the second ACS through the use of a first master base station of the first ACS and a second master base station of the second ACS.

This summary is provided to introduce simplified concepts of an active coordination set for mobility management. The simplified concepts are further described below in the Detailed Description. This summary is not intended to identify essential features of the claimed subject matter, nor is it intended for use in determining the scope of the claimed subject matter.

BRIEF DESCRIPTION OF THE DRAWINGS

Aspects of multiple active-coordination-set aggregation for mobility management are described with reference to the following drawings. The same numbers are used throughout the drawings to reference like features and components.

DETAILED DESCRIPTION

Figure 1:
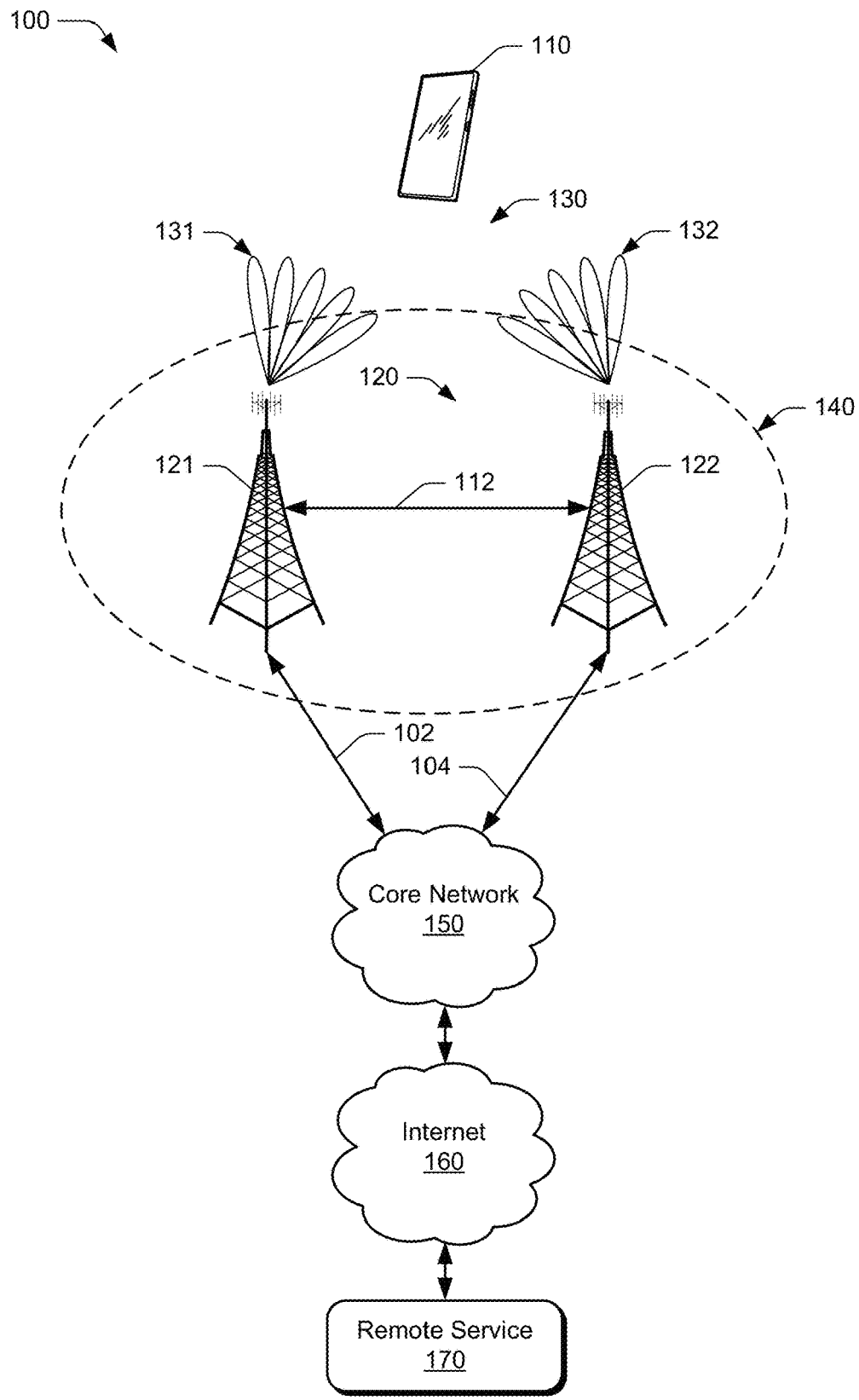
FIG. 1 illustrates an example wireless network system in which various aspects of multiple active-coordination-set aggregation for mobility management can be implemented.

This document describes methods, devices, systems, and means for multiple active-coordination-set (ACS) aggregation for mobility management. The evolution of wireless communication systems to fifth generation (5G) New Radio (5G NR) and Sixth Generation (6G) technologies provides higher data rates to users. By employing techniques, such as Coordinated MultiPoint (CoMP) or Dual Connectivity (DC) over beamformed wireless connections, higher data rates can be provided at the edges of 5G and 6G cells. However, the management of user equipment (UE) mobility and handovers becomes increasingly complex in these environments.

An Active Coordination Set (ACS) is a user equipment-specific set of base stations (e.g., 5G and/or 6G base stations) that are determined by the user equipment to be usable for wireless communication. More specifically, the base stations in the ACS are usable for joint transmission and/or reception (joint communication) between the user equipment and any or all of the base stations in the ACS. The joint transmission and/or reception techniques include CoMP, Single Radio Access Technology (RAT) Dual Connectivity (single-RAT DC), and/or Multi-Radio Access Technology Dual Connectivity (MR-DC).

A master base station of the ACS coordinates joint transmission and/or reception for the user equipment. For example, the master base station uses the ACS to schedule air interface resources for the set of base stations communicating with the UE, thus coordinating the joint transmission through joint scheduling. By using this joint scheduling for communications with the UE, scheduling efficiency is increased, and inter-cell interference (ICI) is reduced in the wireless network.

Multiple ACSs can be configured for the UE to aggregate data throughput for the UE. Each ACS can be configured for a different carrier or RAT. At least one ACS can be directionally defined for the UE, such that communications between the UE and a particular ACS include only uplink data or only downlink data. Communication between the ACSs can occur through respective master base stations. For example, the master base station of one ACS can communicate with another master base station of another ACS configured for the UE to aggregate the data throughput for the UE.

In implementations of multiple ACS aggregation for mobility management, a master base station coordinates aggregation of control-plane and user-plane communications, generated by a first active-coordination-set (ACS) for a first joint communication between the first ACS and a user equipment (UE) where the first ACS includes the master base station and at least a second base station. The master base station also receives, from a second master base station of a second ACS, control-plane information or user-plane data associated with a second joint communication between the second ACS and the UE, the second ACS including the second master base station and at least a third base station. In implementations, the master base station aggregates the control-plane and user-plane communications generated by the first ACS with at least a portion of the control-plane information or the user-plane data from the second master base station to coordinate data throughput to the user equipment.

Aspects of multiple ACS aggregation for mobility management include a UE processing a first set of joint communications exchanged with a first set of two or more base stations included in a first ACS using a first carrier of a first radio access technology. The UE also processes a second set of joint communications exchanged with a second set of two or more base stations included in a second ACS using a second carrier that is different than the first carrier. In implementations, the second set of joint communications are coordinated with the first set of joint communications, such as by the first ACS coordinating with the second ACS through the use of a first master base station of the first ACS and a second master base station of the second ACS.

In some aspects, a method for implementing multiple ACS aggregation by a master base station for mobility management of a UE is disclosed. The method includes the master base station coordinating aggregation of a first set of distributed transmissions between the UE and a first set of base stations forming a first ACS. The first set of base stations includes the master base station and at least one other base station. The master base station receives, from another master base station of a second ACS formed by a second set of base stations including the other master base station and at least one additional base station, control-plane data associated with a second set of distributed transmissions between the UE and the second set of base stations. Then, the master base station aggregates the first set of transmissions with the second set of transmissions for the UE.

In aspects, a method for multiple ACS aggregation by a UE is described. The method includes the UE jointly communicating with a first set of two or more base stations included in a first ACS. The UE also jointly communicates with a second set of two or more base stations included in a second ACS. In implementations, the UE uses a first carrier or RAT to communicate with the first ACS and a second carrier or RAT to communicate with the second ACS. In addition or in the alternative, each ACS is directionally defined for a specific UE, such that the UE communicates with the first ACS for only uplink data and with the second ACS for only downlink data.

In another aspect, a base station is described that includes a radio-frequency transceiver and a processor and memory system coupled to the radio-frequency transceiver. The processor and memory system is configured to aggregate transmissions between a UE and a first ACS. The first ACS includes a first plurality of base stations including the base station. In addition, the processor and memory system is configured to transmit control-plane data associated with the transmissions to a master base station of a second ACS defined by a second plurality of base stations. The control-plane data is transmitted effective to enable the master base station of the second ACS to coordinate aggregation of the transmissions between the UE and the first ACS with additional transmissions between the UE and the second ACS.

While features and concepts of the described systems and methods for multiple active-coordination-set aggregation for mobility management can be implemented in any number of different environments, systems, devices, and/or various configurations, aspects of multiple active-coordination-set aggregation for mobility management are described in the context of the following example devices, systems, and configurations.

Example Environment

FIG. 1 illustrates an example environment 100 in which various aspects of multiple active-coordination-set aggregation for mobility management can be implemented. The example environment 100 includes a user equipment 110 (UE 110) that communicates with one or more base stations 120 (illustrated as base stations 121 and 122), through one or more wireless communication links 130 (wireless link 130), illustrated as wireless links 131 and 132. In this example, the UE 110 is implemented as a smartphone. Although illustrated as a smartphone, the UE 110 may be implemented as any suitable computing or electronic device, such as a mobile communication device, a modem, cellular phone, gaming device, navigation device, media device, laptop computer, desktop computer, tablet computer, smart appliance, or vehicle-based communication system. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, a 6G node B, or the like) may be implemented in a macrocell, microcell, small cell, picocell, and the like, or any combination thereof.

The base stations 120 communicate with the UE 110 using the wireless links 131 and 132, which may be implemented as any suitable type of wireless link. The wireless links 131 and 132 can include a downlink of data and control information communicated from the base stations 120 to the UE 110, an uplink of other data and control information communicated from the UE 110 to the base stations 120, or both. The wireless links 130 may include one or more wireless links or bearers implemented using any suitable communication protocol or standard, or combination of communication protocols or standards such as 3rd Generation Partnership Project Long-Term Evolution (3GPP LTE), Fifth Generation New Radio (5G NR), 6G, and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110. Additionally, multiple wireless links 130 may be configured for single-radio access technology (RAT) (single-RAT) dual connectivity (single-RAT-DC) or multi-RAT dual connectivity (MR-DC).

The base stations 120 are collectively a Radio Access Network 140 (RAN, Evolved Universal Terrestrial Radio Access Network, E-UTRAN, 5G NR RAN or NR RAN). The base stations 121 and 122 in the RAN 140 are connected to a core network 150, such as a Fifth Generation Core (5GC) or 6G core network. The base stations 121 and 122 connect, at 102 and 104 respectively, to the core network 150 using an NG2 interface (or a similar 6G interface) for control-plane signaling and using an NG3 interface (or a similar 6G interface) for user-plane data communications. In addition to connections to core networks, base stations 120 may communicate with each other using an Xn Application Protocol (XnAP), at 112, to exchange user-plane and control-plane data. The UE 110 may also connect, using the core network 150, to public networks, such as the Internet 160 to interact with a remote service 170.

Example Devices

Figure 2:
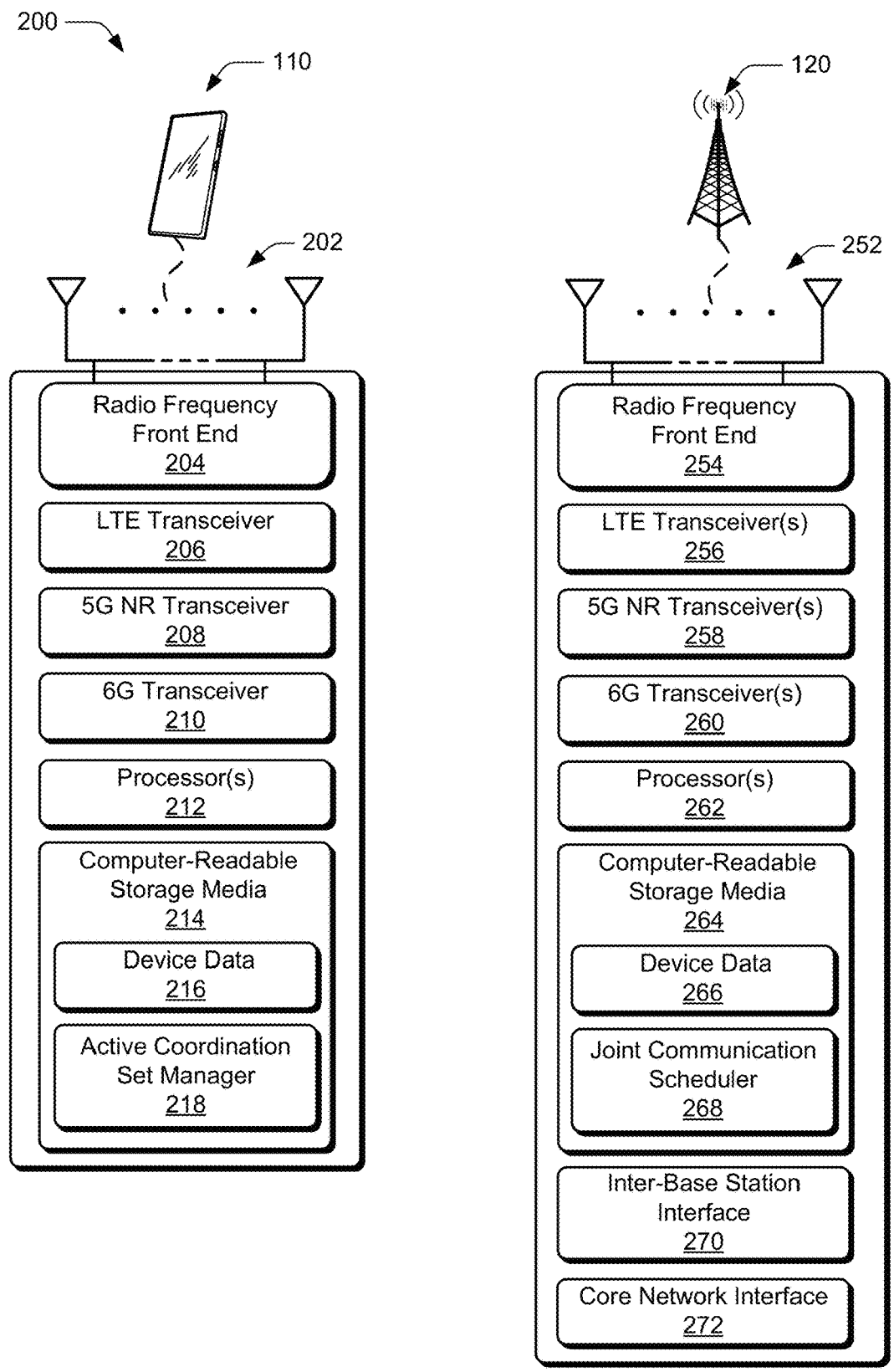
FIG. 2 illustrates an example device diagram that can implement various aspects of multiple active-coordination-set aggregation for mobility management.

FIG. 2 illustrates an example device diagram 200 of the UE 110 and the base stations 120. The UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, a 5G NR transceiver 208, and a 6G transceiver 210 for communicating with base stations 120 in the RAN 140. The RF front end 204 of the UE 110 can couple or connect the LTE transceiver 206, the 5G NR transceiver 208, and the 6G transceiver 210 to the antennas 202 to facilitate various types of wireless communication. The antennas 202 of the UE 110 may include an array of multiple antennas that are configured similarly to or differently from each other. The antennas 202 and the RF front end 204 can be tuned to, and/or be tunable to, one or more frequency bands defined by the 3GPP LTE, 5G NR, and 6G communication standards and implemented by the LTE transceiver 206, the 5G NR transceiver 208, and/or the 6G transceiver 210. Additionally, the antennas 202, the RF front end 204, the LTE transceiver 206, the 5G NR transceiver 208, and/or the 6G transceiver 210 may be configured to support beamforming for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE, 5G NR, and 6G communication standards.

The UE 110 also includes processor(s) 212 and computer-readable storage media 214 (CRM 214). The processor 212 may be a single core processor or a multiple core processor composed of a variety of materials, such as silicon, polysilicon, high-K dielectric, copper, and so on. The computer-readable storage media described herein excludes propagating signals. CRM 214 may include any suitable memory or storage device such as random-access memory (RAM), static RAM (SRAM), dynamic RAM (DRAM), non-volatile RAM (NVRAM), read-only memory (ROM), or Flash memory useable to store device data 216 of the UE 110. The device data 216 includes user data, multimedia data, beamforming codebooks, applications, and/or an operating system of the UE 110, which are executable by processor(s) 212 to enable user-plane communication, control-plane signaling, and user interaction with the UE 110.

In some implementations, the CRM 214 may also include an active coordination set (ACS) manager 218. The ACS manager 218 can communicate with the antennas 202, the RF front end 204, the LTE transceiver 206, the 5G NR transceiver, and/or the 6G transceiver 210 to monitor the quality of the wireless communication links 130. Based on this monitoring, the ACS manager 218 can determine to add or remove base stations 120 from the ACS and/or trigger the transmission of an uplink ACS sounding signal. The active coordination set manager 218 can also communicate with the antennas 202, the RF front end 204, the LTE transceiver 206, the 5G NR transceiver, and/or the 6G transceiver 210 to communicate uplink data via one ACS and downlink data via a different ACS.

The device diagram for the base stations 120, shown in FIG. 2, includes a single network node (e.g., a gNode B). The functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, one or more 5G NR transceivers 258, and/or one or more 6G transceivers 260 for communicating with the UE 110. The RF front end 254 of the base stations 120 can couple or connect the LTE transceivers 256, the 5G NR transceivers 258, and/or the 6G transceivers 260 to the antennas 252 to facilitate various types of wireless communication. The antennas 252 of the base stations 120 may include an array of multiple antennas that are configured similarly to or differently from each other. The antennas 252 and the RF front end 254 can be tuned to, and/or be tunable to, one or more frequency bands defined by the 3GPP LTE, 5G NR, and 6G communication standards, and implemented by the LTE transceivers 256, one or more 5G NR transceivers 258, and/or one or more 6G transceivers 260. Additionally, the antennas 252, the RF front end 254, the LTE transceivers 256, one or more 5G NR transceivers 258, and/or one or more 6G transceivers 260 may be configured to support beamforming, such as Massive-MIMO, for the transmission and reception of communications with the UE 110.

The base stations 120 also include processor(s) 262 and computer-readable storage media 264 (CRM 264). The processor 262 may be a single core processor or a multiple core processor composed of a variety of materials, such as silicon, polysilicon, high-K dielectric, copper, and so on. CRM 264 may include any suitable memory or storage device such as random-access memory (RAM), static RAM (SRAM), dynamic RAM (DRAM), non-volatile RAM (NVRAM), read-only memory (ROM), or Flash memory useable to store device data 266 of the base stations 120. The device data 266 includes network scheduling data, radio resource management data, beamforming codebooks, applications, and/or an operating system of the base stations 120, which are executable by processor(s) 262 to enable communication with the UE 110.

CRM 264 also includes a joint communication scheduler 268. Alternately or additionally, the joint communication scheduler 268 may be implemented in whole or part as hardware logic or circuitry integrated with or separate from other components of the base stations 120. In at least some aspects, the joint communication scheduler 268 configures the LTE transceivers 256, the 5G NR transceivers 258, and the 6G transceiver(s) 260 for communication with the UE 110, as well as communication with a core network, such as the core network 150, and routing user-plane and control-plane data for joint communication. Additionally, the joint communication scheduler 268 may allocate air interface resources and schedule communications for the UE 110 and base stations 120 in the ACS when the base station 120 is acting as a master base station for the base stations 120 in the ACS.

The base stations 120 include an inter-base station interface 270, such as an Xn and/or X2 interface, which the joint communication scheduler 268 configures to exchange user-plane and control-plane data between other base stations 120, to manage the communication of the base stations 120 with the UE 110. The base stations 120 include a core network interface 272 that the joint communication scheduler 268 configures to exchange user-plane and control-plane data with core network functions and/or entities.

Figure 3:
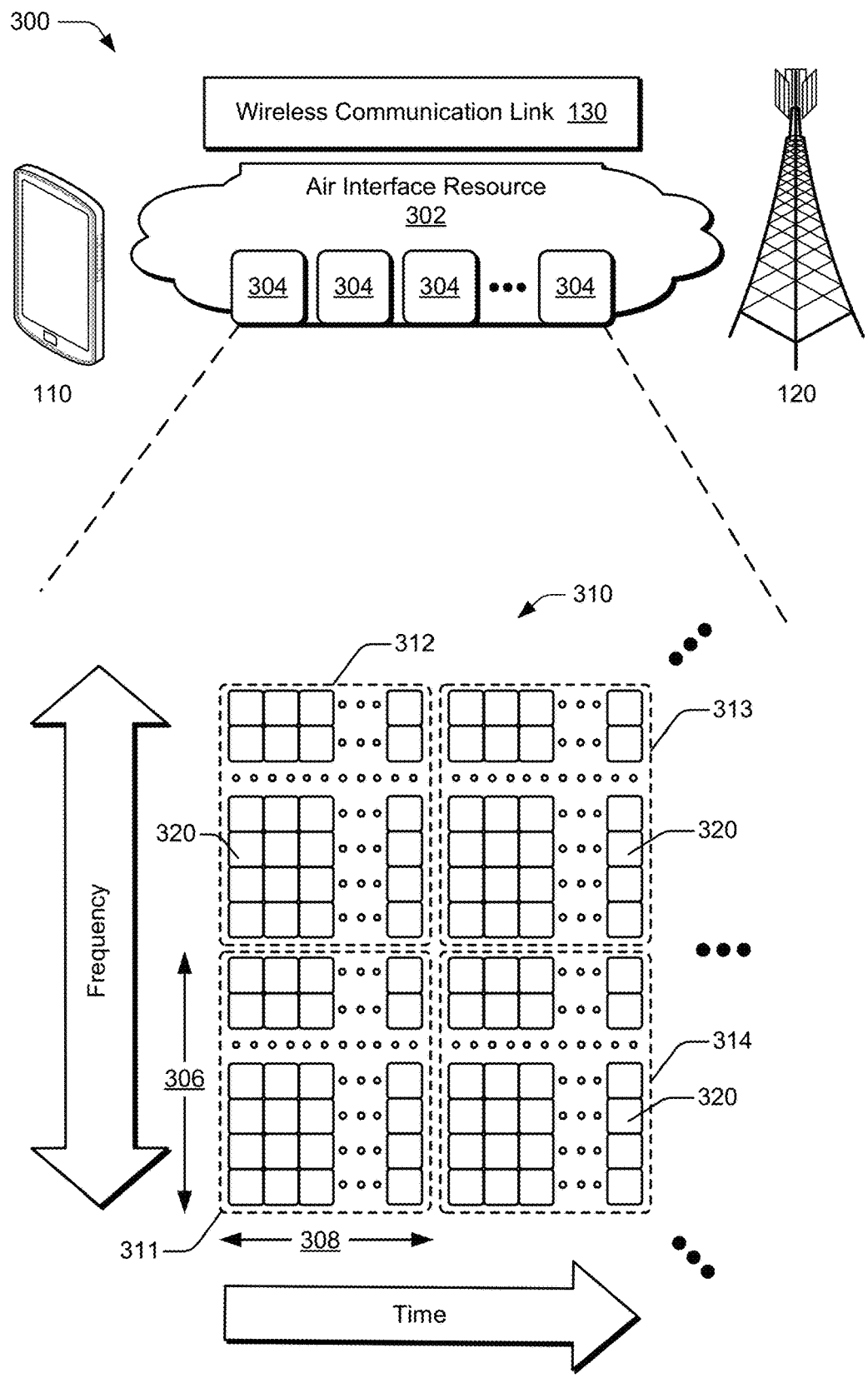
FIG. 3 illustrates an air interface resource that extends between a user equipment and a base station and with which various aspects of multiple active-coordination-set aggregation for mobility management techniques can be implemented.

FIG. 3 illustrates an air interface resource that extends between a user equipment and a base station and with which various aspects of multiple active-coordination-set aggregation for mobility management can be implemented. The air interface resource 302 can be divided into resource units 304, each of which occupies some intersection of frequency spectrum and elapsed time. A portion of the air interface resource 302 is illustrated graphically in a grid or matrix having multiple resource blocks 310, including example resource blocks 311, 312, 313, 314. An example of a resource unit 304 therefore includes at least one resource block 310. As shown, time is depicted along the horizontal dimension as the abscissa axis, and frequency is depicted along the vertical dimension as the ordinate axis. The air interface resource 302, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base stations 120 allocate portions (e.g., resource units 304) of the air interface resource 302 for uplink and downlink communications. Each resource block 310 of network access resources may be allocated to support respective wireless communication links 130 of multiple UE 110. In the lower left corner of the grid, the resource block 311 may span, as defined by a given communication protocol, a specified frequency range 306 and comprise multiple subcarriers or frequency sub-bands. The resource block 311 may include any suitable number of subcarriers (e.g., 12) that each correspond to a respective portion (e.g., 15 kHz) of the specified frequency range 306 (e.g., 180 kHz). The resource block 311 may also span, as defined by the given communication protocol, a specified time interval 308 or time slot (e.g., lasting approximately one-half millisecond or 7 orthogonal frequency-division multiplexing (OFDM) symbols). The time interval 308 includes subintervals that may each correspond to a symbol, such as an OFDM symbol. As shown in FIG. 3, each resource block 310 may include multiple resource elements 320 (REs) that correspond to, or are defined by, a subcarrier of the frequency range 306 and a subinterval (or symbol) of the time interval 308. Alternatively, a given resource element 320 may span more than one frequency subcarrier or symbol. Thus, a resource unit 304 may include at least one resource block 310, at least one resource element 320, and so forth.

In example implementations, multiple UE 110 (one of which is shown) are communicating with the base stations 120 (one of which is shown) through access provided by portions of the air interface resource 302. The joint communication scheduler 268 (shown in FIG. 2) may determine a respective data-rate, type of information, or amount of information (e.g., data or control information) to be communicated (e.g., transmitted) by the UE 110. For example, the joint communication scheduler 268 can determine that each UE 110 is to transmit at a different respective data rate or transmit a different respective amount of information. The joint communication scheduler 268 then allocates one or more resource blocks 310 to each UE 110 based on the determined data rate or amount of information.

Additionally, or in the alternative to block-level resource grants, the joint communication scheduler 268 may allocate resource units at an element-level. Thus, the joint communication scheduler 268 may allocate one or more resource elements 320 or individual subcarriers to different UEs 110. By so doing, one resource block 310 can be allocated to facilitate network access for multiple UEs 110. Accordingly, the joint communication scheduler 268 may allocate, at various granularities, one or up to all subcarriers or resource elements 320 of a resource block 310 to one UE 110 or divided across multiple UEs 110, thereby enabling higher network utilization or increased spectrum efficiency.

The joint communication scheduler 268 can therefore allocate the air interface resource 302 by resource unit 304, resource block 310, frequency carrier, time interval, resource element 320, frequency subcarrier, time subinterval, symbol, spreading code, some combination thereof, and so forth. Based on respective allocations of resource units 304, the joint communication scheduler 268 can transmit respective messages to the multiple UEs 110 indicating the respective allocation of resource units 304 to each UE 110. Each message may enable a respective UE 110 to queue the information or configure the LTE transceiver 206, the 5G NR transceiver 208, and/or the 6G transceiver 210 to communicate using the allocated resource units 304 of the air interface resource 302.

User Plane and Control Plane Signaling

Figure 4:
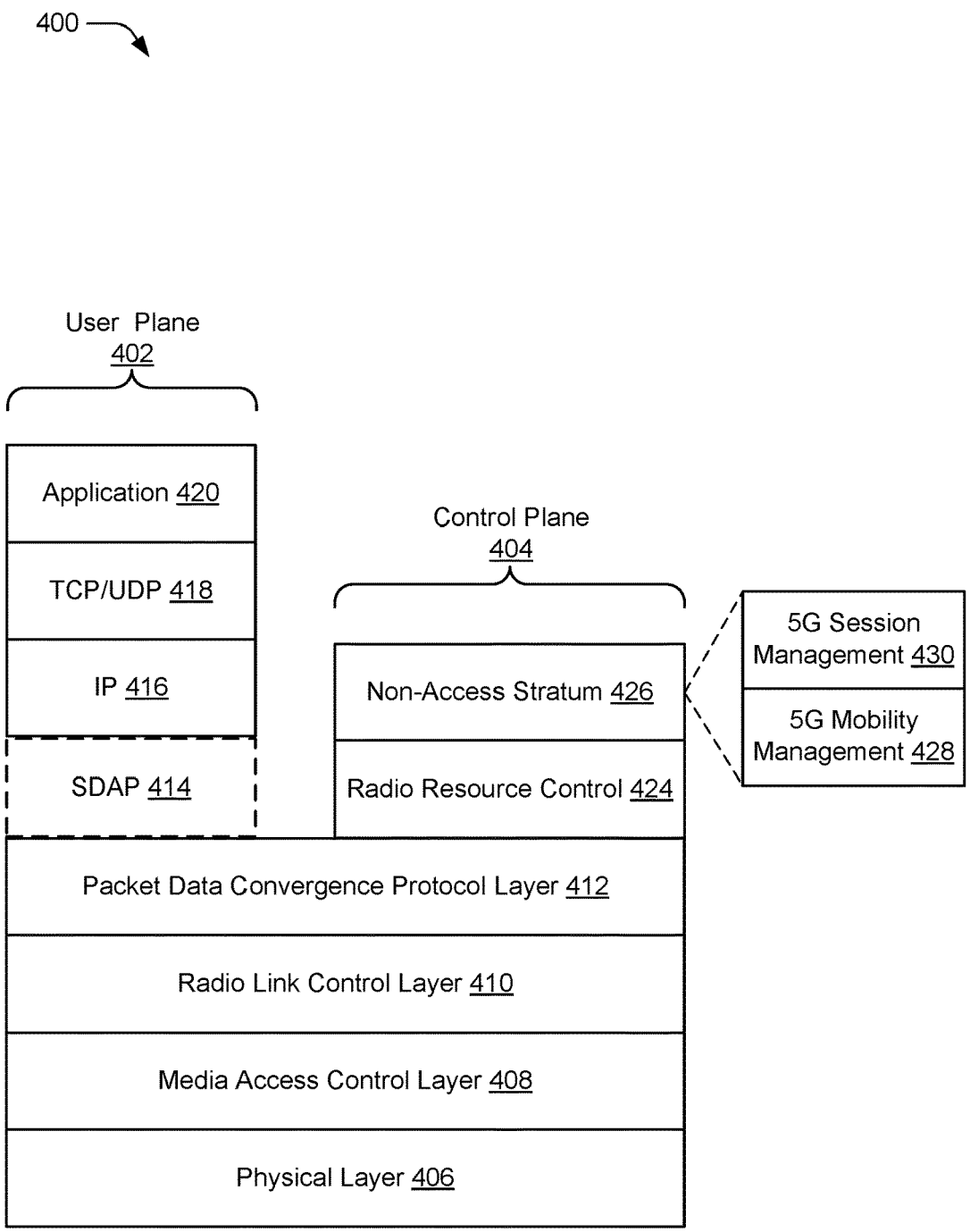
FIG. 4 illustrates an example wireless networking stack with which aspects of the described techniques can be implemented.

FIG. 4 illustrates an example block diagram 400 of a wireless network stack model 400 that characterizes a communication system for the example environment 100, in which various aspects of multiple ACS aggregation for mobility management can be implemented. The wireless network stack 400 includes a user plane 402 and a control plane 404. Upper layers of the user plane 402 and the control plane 404, share common lower layers in the wireless network stack 400. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 406 (PHY layer 406), a Media Access Control layer 408 (MAC layer 408), a Radio Link Control layer 410 (RLC layer 410), and a Packet Data Convergence Protocol layer 412 (PDCP layer 412). The physical layer 406 provides hardware specifications for devices that communicate with each other. As such, the physical layer 406 establishes how devices connect to each other, assists in managing how communication resources are shared among devices, and the like.

The MAC layer 408 specifies how data is transferred between devices. Generally, the MAC layer 408 provides a way in which data packets being transmitted are encoded and decoded into bits as part of a transmission protocol.

The RLC layer 410 provides data transfer services to higher layers in the wireless network stack 400. Generally, the RLC layer 410 provides error correction, packet segmentation and reassembly, and management of data transfers in various modes, such as acknowledged, unacknowledged, or transparent modes.

The PDCP layer 412 provides data transfer services to higher layers in the wireless network stack 400. Generally, the PDCP layer 412 provides transfer of user plane 402 and control plane 404 data, header compression, ciphering, and integrity protection.

Above the PDCP layer 412, the wireless network stack splits into the user-plane stack 402 and the control-plane stack 404. The user plane 402 layers include an optional Service Data Adaptation Protocol layer 414 (SDAP 414), an Internet Protocol layer 416 (IP 416), a Transmission Control Protocol/User Datagram Protocol layer 418 (TCP/UDP 418), and an application 420 that transfer data using the wireless link 130. The optional SDAP layer 414 is present in 5G NR networks and maps a Quality of Service (QoS) flow for each data radio bearer and marks QoS flow identifiers in uplink and downlink data packets for each packet data session. The IP layer 416 specifies how the data from the application 420 is transferred to a destination node. The TCP/UDP layer 418 is used to verify that data packets intended to be transferred to the destination node reached the destination node, using either TCP or UDP for data transfers by the application 420. In some implementations, the user plane 402 may also include a data services layer that provides data transport services to transport application data, such as IP packets including web browsing content, video content, image content, audio content, social media content, and so forth.

The control plane 404 includes Radio Resource Control 424 (RRC 424) and a Non-Access Stratum 426 (NAS 426). The RRC 424 establishes and releases connections and radio bearers, broadcasts system information, performs power control, and so forth. The RRC 424 supports 3GPP access but does not support non-3GPP access (e.g., Wi-Fi). The NAS 426 provides support for mobility management (e.g., using a 5GMM layer 428) and packet data bearer contexts (e.g., using a fifth-generation session management (5GSM) layer 430) between the UE 110 and entities or functions in the core network 150, such as an Access and Mobility Management Function (AMF), or a Mobility Management Entity (MME), or the like. The NAS 426 supports 3GPP access and non-3GPP access.

In the UE 110, each layer in both the user plane 402 and the control plane 404 of the wireless network stack 400 interacts with a corresponding peer layer or entity in a base station 120, a core network entity or function, and/or a remote service, to support user applications and control operation of the UE 110 in the NR RAN or the E-UTRAN.

Active Coordination Set

Figure 5:
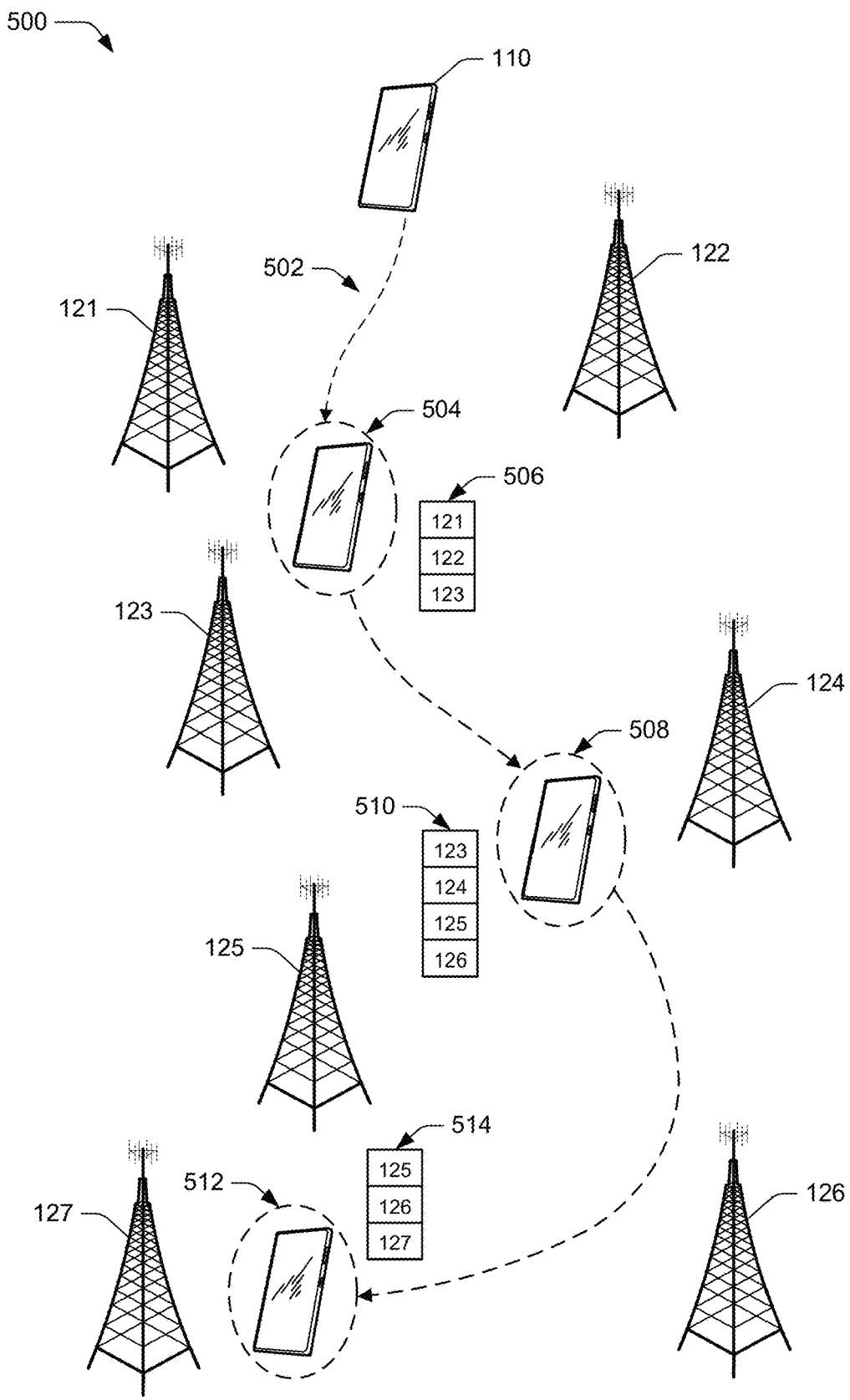
FIG. 5 illustrates an example of a user equipment moving through a radio access network that includes multiple base stations in accordance with aspects of an active coordination set for mobility management techniques.

In aspects, an active coordination set for mobility management is described. FIG. 5 illustrates an example environment 500 in which a UE 110 is moving through a radio access network (RAN) that includes multiple base stations 120, illustrated as base stations 121-127.

For example, the UE 110 follows a path 502 through the RAN 140 while periodically measuring the link quality of base stations that are currently in the ACS and candidate base stations that the UE 110 may add to the ACS. For example, at position 504, the ACS at 506 includes the base stations 121, 122, and 123. As the UE 110 continues to move, at position 508, the UE 110 has deleted base station 121 and base station 122 from the ACS and added base stations 124, 125, and 126, as shown at 510. Continuing along the path 502, the UE 110, at position 512, has deleted the base stations 123 and 124 and added the base station 127, as shown in the ACS at 514.

Figure 6:
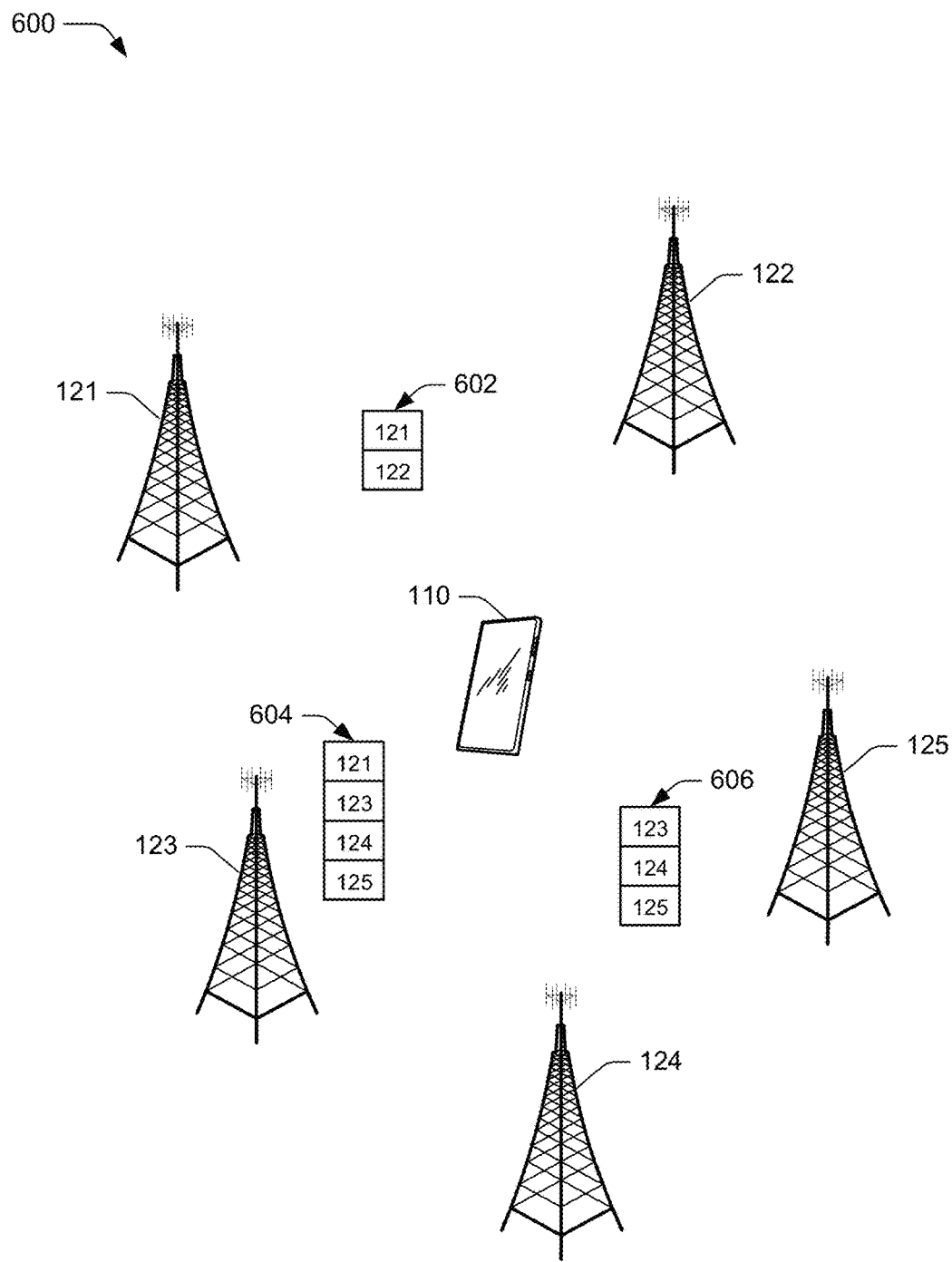
FIG. 6 illustrates and example of a user equipment configured with multiple active coordination sets.

FIG. 6 illustrates an example environment 600 in which a UE 110 is configured with multiple active coordination sets. The ACS may be UE-specific and carrier-specific (or RAT-specific). For example, the UE 110 may be configured with multiple different active coordination sets, each corresponding to a different carrier or RAT. ACSs corresponding to different carriers or RATs for a particular UE can each include a different set of base stations. In some instances, one base station may not be able to cover all the carriers that the UE supports, so that one base station may be included in one ACS but not in another ACS. One or more base stations may, however, be included in multiple ACSs for the UE.

The example illustrated in FIG. 6 shows the UE 110 configured with three different ACSs, e.g., ACS 602, ACS 604, and ACS 606. The ACS 602 is defined by base stations 121 and 122. The ACS 604 is defined by base stations 121, 123, 124, and 125. The ACS 606 is defined by base stations 123, 124, and 125.

In aspects, the ACS may be directionally defined. For example, a specific UE may be configured with a first ACS that is defined for uplink only and a second, different ACS that is defined for downlink only. In this way, the first ACS may define a first set of base stations to only coordinate for uplink aggregation for this specific UE and the second ACS may define a second set of base stations to only coordinate downlink aggregation for this specific UE. In another example, the uplink and downlink aggregations may be handled by different subsets of base stations within the same ACS for the UE. For example, a particular subset of base stations within the ACS may be defined to coordinate only for the uplink direction for the UE 110 using a specific carrier or RAT.

The UE 110 can be configured for a first ACS for uplink only for a specific carrier or RAT for the UE 110 and a second ACS for uplink only using a different carrier or RAT than the first ACS. Similarly, the UE 110 can be configured for a first ACS for downlink only for a specific carrier or RAT for the UE 110 and a second ACS for downlink only using a different carrier or RAT than the first ACS. Alternatively, the first ACS or the second ACS can be defined for both uplink and downlink directions using the specific carrier or RAT.

In an example implementation, the base stations 121 and 122 are eNBs forming a first ACS 602 configured for 4G uplink-only transmissions for the UE 110. The base stations 123, 124, and 125 are ng-eNBs included, along with the base station 121, in a second ACS 604 configured for downlink-only LTE transmissions. The base stations 123, 124, and 125 form a third ACS 606 configured for ng-eNB-only uplink and downlink transmissions.

In another example implementation, the base stations 121 and 122 forming the first ACS 602 are eNBs configured on a first carrier for uplink and downlink transmissions. The base stations 123, 124, and 125 are gNBs and form, along with the base station 121, the second ACS 604 configured on a second carrier for uplink and downlink transmissions. In addition, the base stations 123, 124, and 125 form a third ACS 606 using a third carrier that is different from the first and second carriers used by the first and second ACSs 602, 604. The UE 110 can utilize two or more of the ACSs 602, 604, and 606 for dual connectivity and/or carrier aggregation.

Note that different RATs can have different ACSs. For instance, a first RAT (4G) includes the eNBs in the first ACS 602 and a second RAT (LTE) includes the ng-eNBs in the second ACS 604. Alternatively, the base stations 123, 124, and 125 may be gNBs configured for 5G transmissions. In this case, the UE 110 uses 4G signals to communicate with the first ACS 602 and 5G signals to communicate with the third ACS 606.

Multiple Active-Coordination-Set Aggregation

The techniques described herein can support active coordination while also performing carrier aggregation across multiple frequencies. In aspects, multiple ACSs can aggregate data throughput for the UE 110 by combining at least a portion of user data and/or control data transmitted between the UE 110 and at least two different ACSs configured for the UE 110. The multiple ACS aggregation can be performed at a lower layer, such as a MAC layer. Alternately or in addition, the multiple ACS aggregation can be performed at an upper layer, such as layer-2 (e.g., PDCP layer). As described above, the ACS configuration for downlink and uplink directions can be different from each other, e.g., downlink-only, uplink-only, or both uplink and downlink for a particular ACS.

To facilitate aggregation of data throughput of the UE 110 between different ACSs, each ACS corresponding to a particular carrier or RAT for the UE 110 can include a master base station for that particular carrier or RAT. Master base stations from different ACSs coordinate the aggregation for the UE 110. In other words, a first master base station of a first ACS that uses a first carrier can coordinate with a second master base station of a second ACS that uses a second carrier. For example, the first master base station can forward at least a portion of data for the UE 110 to the second master base station for the same UE 110 for processing at the second master base station. For uplink transmissions from the UE 110, the first master base station of the first ACS can forward the received uplink transmission to the second master base station of the second ACS to aggregate the data at the second master base station.

The first master base station of the first ACS can forward layer-3 control information for the UE 110 to the second master base station of the second ACS. The layer-3 control information can include management information or control information for ACS management, such as adding or removing a base station from the first or second ACS.

The master base station of one ACS of the UE 110 can transmit lower-layer control information (e.g., layer-1, layer-2) for the UE 110 to the master base station of another ACS. The lower-layer information may include scheduling information, hybrid automatic repeat request (HARQ) information, or upper-layer flow control information (e.g., layer-2 flow control information, layer-2 acknowledgement information). Accordingly, this lower-layer control information is transmitted across the ACSs through the master base stations.

Master base stations of different ACSs can also coordinate the Quality of Service (QoS) flow routing for a particular IP flow or service. This may improve differentiation of QoS and satisfy the QoS requirement. This latency-sensitive flow may be routed through a particular ACS, while broadband service is routed through one or more other ACSs.

In aspects, an ACS can carry a layer-1 assignment, grant information, or HARQ feedback (ACK/NACK) for another ACS. An example includes a first ACS (ACS1) and a second ACS (ACS2) for the UE 110. The uplink information sent on ACS2 can pass through ACS1. This enables one ACS to carry HARQ feedback for another ACS. If a grant for ACS2 passes through ACS1 to the UE 110, the UE 110 can begin demodulating the data from ACS2. Other information can also pass through different ACSs, such as power control, channel-state information, scheduling information, and so forth. One ACS can also carry system information of another ACS. This may enable the UE 110 to access the other ACS.

One ACS may also carry layer-2 or layer-3 feedback for another ACS. Layer-3 feedback may include layer-3 control messages such as ACS management information (e.g., adding or removing a base station from the ACS) and ACS configuration. The layer-2 feedback may include layer-2 control messages such as power headroom (for a secondary ACS), buffer and queue management, upper-layer flow control and acknowledgement, and so on.

Figure 7:
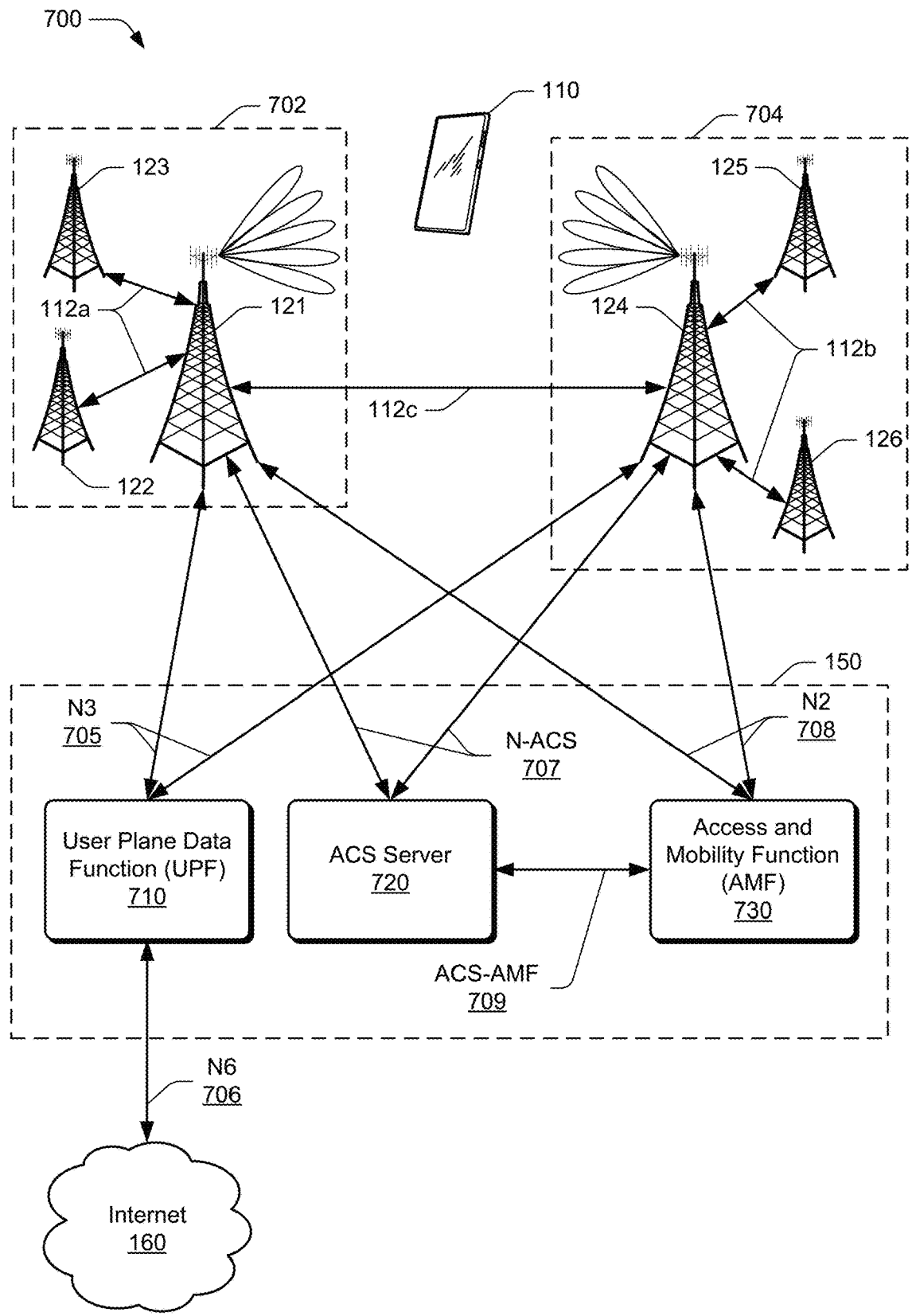
FIG. 7 illustrates an example environment in which various aspects of multiple active-coordination-set aggregation for mobility management can be implemented.

FIG. 7 illustrates an example environment 700 implementing various aspects of multiple ACS aggregation for mobility management. The UE 110 is engaged in joint transmission and/or reception (joint communication) with the three base stations 121, 122, and 123, which form a first ACS (ACS1 702). The base station 121 is acting as a master base station for the joint transmission and/or reception. The master base station can change as base stations are added and/or removed from the ACS1 702 or as network conditions change, and the UE 110 may not be informed which base station is designated as the master base station. The master base station coordinates control-plane and user-plane communications for the joint communication with the UE 110 using the Xn interfaces 112a (or a similar 5G interface) to the base stations 122 and 123 and maintains the user-plane context between the UE 110 and the core network 150. The coordination may be performed using proprietary or standards-based messaging, procedures, and/or protocols.

The UE 110 may also be engaged in joint communication with three additional base stations 124, 125, and 126, which form a second ACS (ACS2 704). In aspects, ACS2 704 includes at least one base station that is not included in ACS1 702, e.g., at least one of the base stations 124, 125, or 126 is different than the base stations 121, 122, or 123. In some cases, however, ACS1 702 and ACS2 704 may share one or more common base stations, e.g., at least one of the base stations 121, 122, or 123 is the same base station as the base stations 124, 125, or 126. In the example environment 700, the base station 124 acts as a master base station for the ACS2 704 for the joint communication. Like the master base station 121 of ACS1 702, the master base station of the ACS2 704 is also transparent to the UE 110, and the master base station can change as base stations are added and/or removed from the ACS2 704. The master base station of the ACS2 704 coordinates control-plane and user-plane communications for the joint communication with the UE 110 using the Xn interfaces 112b (or a similar 5G interface) to the base stations 125 and 126 and maintains the user-plane context between the UE 110 and the core network 150. The coordination may be performed using proprietary or standards-based messaging, procedures, and/or protocols. In aspects, the ACS1 702 may correspond to a first carrier or RAT for the UE 110 and the ACS2 704 may correspond to a second carrier or RAT for the UE 110. The ACS1 702 may be configured for uplink-only communications with the UE 110 while the ACS2 704 is configured for downlink-only communications with the UE 110. Alternatively, the ACS1 702 may be configured for downlink-only communications with the UE 110 while the ACS2 704 is configured for uplink-only communications with the UE 110. Other examples described with respect to FIG. 6 may also apply to the example ACS1 702 and ACS2 704.

In addition, the master base station 124 of the ACS2 704 (e.g., base station 124) can coordinate control-plane and user-plane communications, for the joint communication with the UE 110, using Xn interface 112c (or similar 5G interface) with the master base station 121 of the ACS1 702 (e.g., base station 121). The master base station 121 of the ACS1 702 may also coordinate such communications for the joint communication with the UE 110 with the master base station 124 of the ACS2 704. As described above, the communications between the master base station 121 of ACS1 702 and the master base station 124 of ACS2 704 can include layer-3 control information for the UE 110, lower-layer control information (e.g., layer-1, layer-2), QoS flow routing, layer-1 assignment, grant information, HARQ feedback, layer-2 or layer-3 feedback, and so on.

The master base station 121 of ACS1 702 schedules air interface resources for the joint communication for the UE 110 and the base stations 121, 122, and 123. Similarly, the master base station 124 of ACS2 704 schedules air interface resources for the joint communication for the UE 110 and the base stations 124, 125, and 126. The master base station (base station 121 or base station 124) of each ACS connects, using an N3 interface 705 (or a 5G equivalent interface) to a User Plane Function 710 (UPF 710) in the core network 150 for the communication of user-plane data to and from the UE 110. The master base station of an ACS distributes the user-plane data to all the base stations in the ACS as part of the joint communication using the Xn interfaces 112. The UPF 710 is further connected to a data network, such as the Internet 160 using the N6 interface 706. UE 110 downlink data can be sent from all of the base stations 120 in the ACS1 702 or the ACS2 704 or any subset of the base stations 120 in the ACS1 702 or the ACS2 704. UE 110 uplink data can be received by all of the base stations 120 in the ACS1 702 or the ACS2 704 or any subset of the base stations 120 in the ACS1 702 or the ACS2 704.

When the UE 110 creates or modifies an ACS, the UE 110 communicates the ACS or the ACS modification to an ACS server 720 that stores the ACS(s) for each UE 110 operating in the RAN 140. Although shown in the core network 150, alternatively the ACS server 720 may be an application server located outside the core network 150. The UE 110 communicates the ACS or ACS modification using the master base station (base station 121 of ACS1 702 or base station 124 of ACS2 704), which is connected to the ACS Server 720 using an N-ACS interface 707. Optionally or alternatively, the UE 110 communicates the ACS or ACS modification to the ACS Server 720 using the Access and Mobility Function 730 (AMF 730), which is connected to the master base station (base station 121 of ACS1 702 or base station 124 of ACS2 704) using an N2 interface 708. The AMF 730 relays ACS-related communications to and from the ACS Server 720 using an ACS-AMF interface 709. ACS data between the UE 110 and the ACS server 720 can be communicated using Radio Resource Control (RRC) communications, Non-Access Stratum (NAS) communications, or application-layer communications.

The ACS server 720 may be implemented as a single network node (e.g., a server). The functionality of the ACS server 720 may be distributed across multiple network nodes and/or devices and may be distributed in any fashion suitable to perform the functions described herein. The ACS server 720 includes processor(s) and computer-readable storage media 704. The processor may be a single core processor, or a multiple core processor composed of a variety of materials, such as silicon, polysilicon, high-K dielectric, copper, and so on. CRM may include any suitable memory or storage device such as random-access memory (RAM), static RAM (SRAM), dynamic RAM (DRAM), non-volatile RAM (NVRAM), read-only memory (ROM), hard disk drives, or Flash memory useful to ACS and related data. The CRM includes applications and/or an operating system of the ACS server 720, which are executable by the processor(s) to enable communication with the UE 110, the master base station 121 of ACS1 702, the master base station 124 of ACS2 704, and the AMF 730. The ACS server 720 includes one or more network interfaces for communication with the master base station 121 of ACS1 702, the master base station 124 of ACS2 704, the AMF 730, and other devices in the core network 150, the UE 110, and/or devices in the RAN 140.

Example Methods

Figure 8:
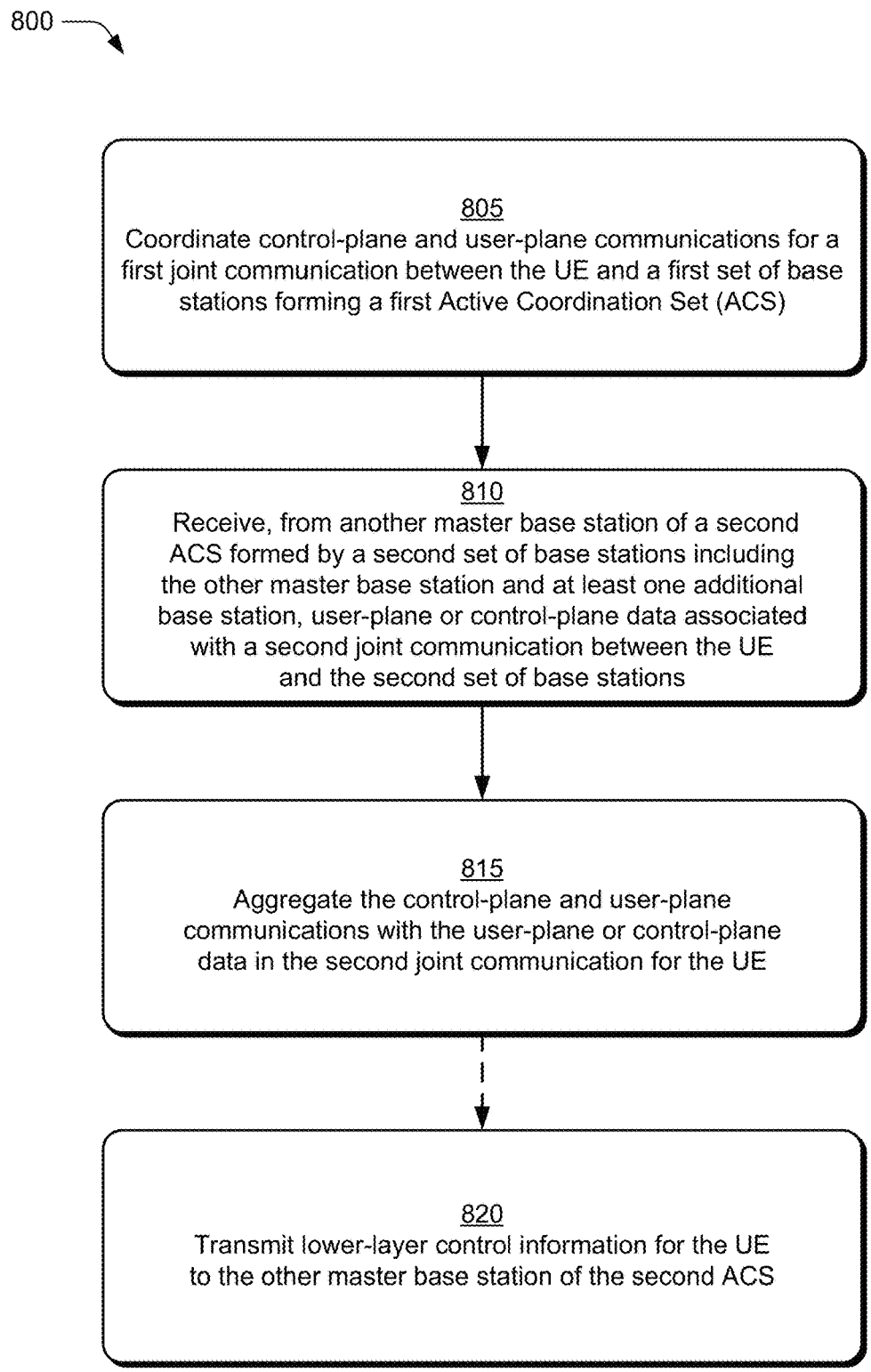
FIG. 8 illustrates an example method for implementing multiple active-coordination-set aggregation by a master base station for mobility management of a UE in accordance with aspects of the techniques described herein.

Example methods 800, 900, 1000, and 1100 are described with reference to FIGS. 8, 9, 10, and 11 in accordance with one or more aspects of multiple ACS aggregation for mobility management. FIG. 8 illustrates example method(s) 800 of a master base station implementing multiple ACS aggregation for mobility management of a UE.

At 805, the master base station coordinates control-plane and user-plane communications for a first joint communication between the UE and a first set of base stations forming a first ACS. In aspects, the first set of base stations includes the master base station and at least one other base station. As further described above, coordinating the control-plane and/or user-plane communications can include scheduling the air interface resources for the set of base stations included in the first ASC that are communicating with the UE. Alternately or additionally, scheduling the air interface resources can include distributing or partitioning the control-plane and/or user plane communications across the air interface resources (e.g., a first base station transmits a first portion of the communications over a first set of air interface resources, a second base station transmits a second portion of the communications over a second set of air interface resources). In implementations, scheduling the air interface resources can include combining at least a portion of the control-plane and/or user-plane communications received across the air interface resources by the set of base stations included in the first ASC that are communicating with the UE.

At 810, the master base station receives, from another master base station of a second ACS formed by a second set of base stations including the other master base station and at least one additional base station, user-plane or control-plane data associated with a second joint communication between the UE and the second set of base stations. For example, the master base station 121 of ACS1 702 can receive user-plane or control-plane data from the master base station 124 of ACS2 704. The control-plane data can, as described above, include lower-layer control information, upper-layer control information, HARQ feedback, grant information, system information, scheduling information, and so forth, corresponding to the ACS2 704. The user-plane data can include uplink data received from the UE or downlink data transmitted to the UE.

At 815, the master base station aggregates the control-plane and user-plane communications in the first joint communication with the user-plane or control-plane data in the second joint communication for the UE. This provides techniques for aggregation of transmissions to different ACSs over different carrier frequencies or RATs. This also enables aggregation of wireless communications between an ACS defined to coordinate for an uplink-only direction for the UE and a different ACS defined to coordinate for a downlink-only direction.

Optionally at 820, the master base station transmits lower-layer control information for the UE to the other master base station of the second ACS. The master base station 121 can transmit such information in any suitable way, examples of which are described above. In some aspects, the information includes at least one of scheduling information or HARQ information for at least one other base station in the first ACS or in the second ACS.

Figure 9:
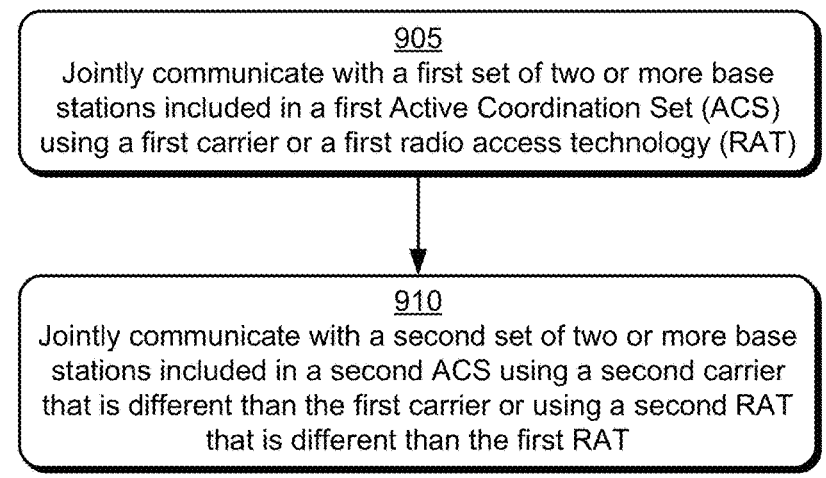
FIG. 9 illustrates an example method for multiple ACS aggregation as generally related to the user equipment communicating with multiple ACSs.

FIG. 9 illustrates example method(s) 900 for multiple active coordination set aggregation for mobility management. The method 900 may be performed by the UE 110 described with respect to FIGS. 1-8.

At 905, a UE jointly communicates with a first set of base stations included in a first ACS using a first carrier or a first RAT. This communication can be distributed to each base station in the first ACS over one or more wireless channels. At 910, the UE jointly communicates with a second set of base stations included in a second ACS using a second carrier that is different than the first carrier or a second RAT that is different than the second RAT.

In aspects, the UE 110 communicates only uplink data to the ACS1 702 and receives only downlink data from the ACS2 704. Alternatively or in addition, the UE 110 communicates with the ACS1 702 using a first carrier frequency and communicates with the ACS2 704 using second, different carrier frequency. In one example, the UE 110 communicates with the ACS1 702 using a first RAT and communicates with the ACS2 704 using a second, different RAT. Any suitable number of ACSs can be used to aggregate wireless communications between the UE 110 and the network.

Figure 10:
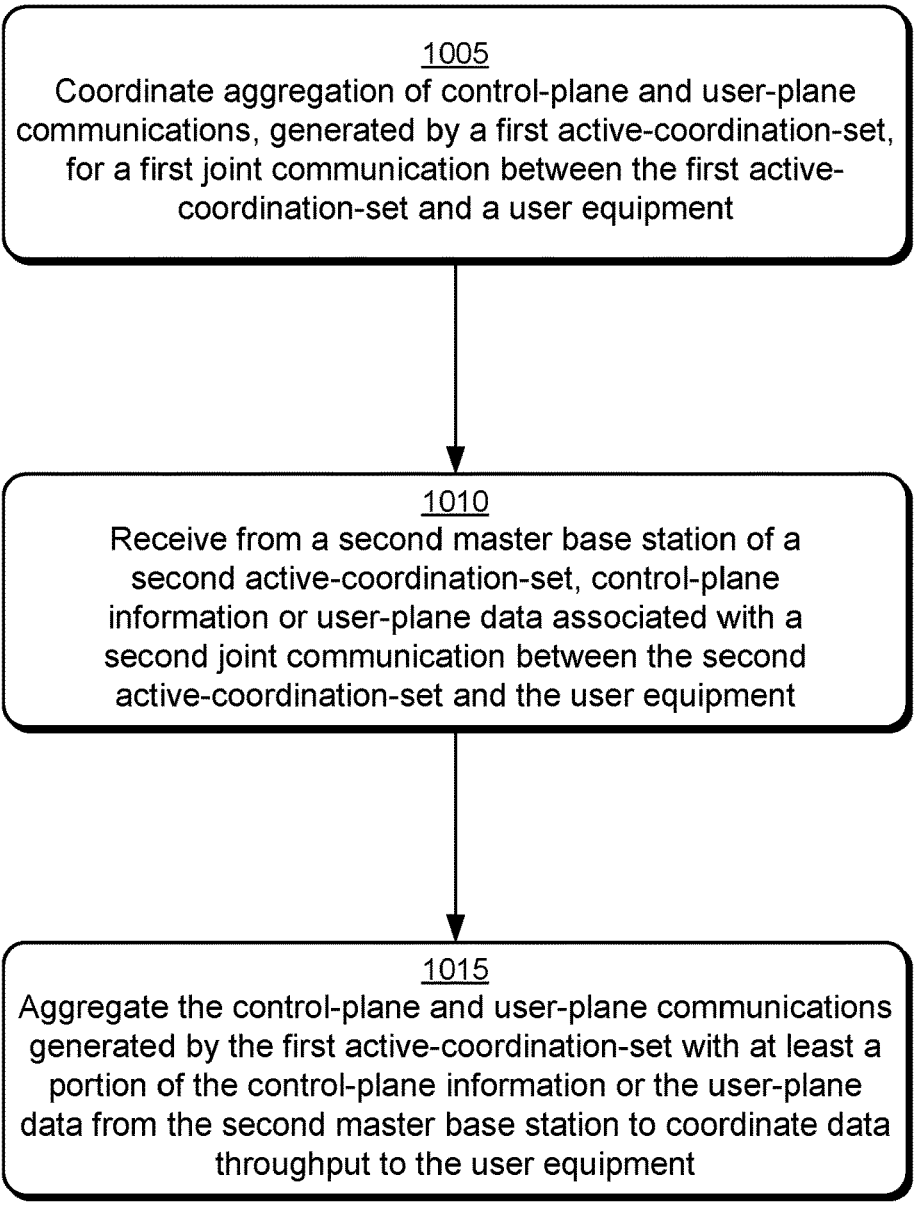
FIG. 10 illustrates an example method for implementing multiple active-coordination-set aggregation for mobility management in accordance with aspects of the techniques described herein.

FIG. 10 illustrates example method 1000 for multiple active-coordination-set aggregation for mobility management. The method 1000 may be performed by a base station, such as base station 120 of FIG. 1, using various aspects described with respect to FIGS. 1-9.

At 1005, the base station coordinates aggregation of control-plane and user-plane communications, generated by a first active-coordination-set (ACS), for a first joint communication between the first ACS and a user equipment (UE), where the first ACS includes the master base station and at least a second base station. For example, the base station (e.g., base station 120) coordinates aggregation of control-plane and user-plane communications (e.g., control-plane information, user-plane data) generated by any one of ACSs 602, 604, 606, 702, or 704 to communicate with the UE (e.g., UE 110). To illustrate, as further described above, coordinating the control-plane and/or user-plane communications can include scheduling the air interface resources for the set of base stations included in the first ASC that are communicating with the UE. Alternately or additionally, scheduling the air interface resources can include distributing or partitioning the control-plane and/or user plane communications across the air interface resources (e.g., a first base station transmits a first portion of the communications over a first set of air interface resources, a second base station transmits a second portion of the communications over a second set of air interface resources). In implementations, scheduling the air interface resources can include combining at least a portion of the control-plane and/or user-plane communications received across the air interface resources by the set of base stations included in the first ASC that are communicating with the UE. Thus, a master base station can coordinate aggregation of the air interface resources of the base stations included in the ACS for the control-plane and/or user-pane communications to combine and/or distribute the control-plane and/or user-plane communications to and/or from the UE.

In some implementations, the first master base station configures the first joint communication generated by the first ACS as carrier aggregation and/or dual connectivity. Alternately or additionally, first master base station configures the first joint communication as directional communications (e.g., uplink-only, downlink only). In at least one example, the first ACS includes a first subset of base stations and a second subset of base stations, where the master base station coordinates the first subset of base stations to handle downlink aggregation of downlink-only transmissions with the UE, and the second subset of base stations to handle uplink aggregation of uplink-only transmissions with the UE.

At 1010, the base station receives, from a second master base station of a second active-coordination-set (ACS), control-plane information or user-plane data associated with a second joint communication between the second ACS and the UE, where the second ACS includes the second master base station and at least a third base station. For example, the base station (e.g., base station 120) receives control-plane information or user-plane data from the second master base station (of any one of ACS 604, ACS 604, ACS 606, ACS 702, ACS 704 that is different from the first ACS), such as at a Media Access Control (MAC) layer of the master base station. As another example, the control-plane information or the user-plane data includes at least one of a layer-1 assignment, grant information, or hybrid automatic repeat request feedback for the second ACS. In some implementations, the control-plane information or user-plane data includes layer-2 control information received at a Packet Data Convergence Protocol layer, such as feedback corresponding to the second ACS. At times, the control-plane information or user-plane data layer-3 control information for the UE (and from the second master base station). The layer-3 control information, for instance, can include management information corresponding to a configuration of the first ACS or the second ACS.

At 1015, the base station aggregates the control-plane and user-plane communications generated by the first ACS with at least a portion of the control-plane information or the user-plane data from the second master base station to coordinate data throughput to the UE. For example, the base station (e.g., base station 120) aggregates the control-plane and user-plane communications with at least a portion of the control-plane information or the user-plane data to coordinate uplink-only communications and/or downlink-only communications. To illustrate, a protocol layer at the base station can aggregate the control-plane and user-plane communications with the portion of the control-plane information or the user-plane data to identify feedback, flow control information, acknowledgements, and so forth, that are used to coordinate the uplink-only communications. As another example, the base station receives an uplink transmission from the second master base station, where the uplink transmission was received by second master base station from the UE. Alternately or additionally, the base station 120 receives uplink transmissions from the UE, and forwards at least a portion of the uplink transmissions to the second master base station.

In some implementations, the base station aggregates the control-plane and user-plane communications generated by the first ACS with at least a portion of the control-plane information or the user-plane data from the second master base station based on satisfying quality-of-service (QoS) requirement(s) for a QoS flow. For example, the master base station selects one of the first ACS and the ACS for satisfying the QoS requirements(s), and then coordinates with the second master base station to route communications associated with the QoS through the selected one of the first ACS and the second ACS and/or scheduling the air interface resources of the selected one for use by the QoS flow. The routed communications can include the control-plane information or the user-plane data from the second master base station, and/or include information that coordinates the QoS flow communications between the first ACS and the second ACS.

Figure 11:
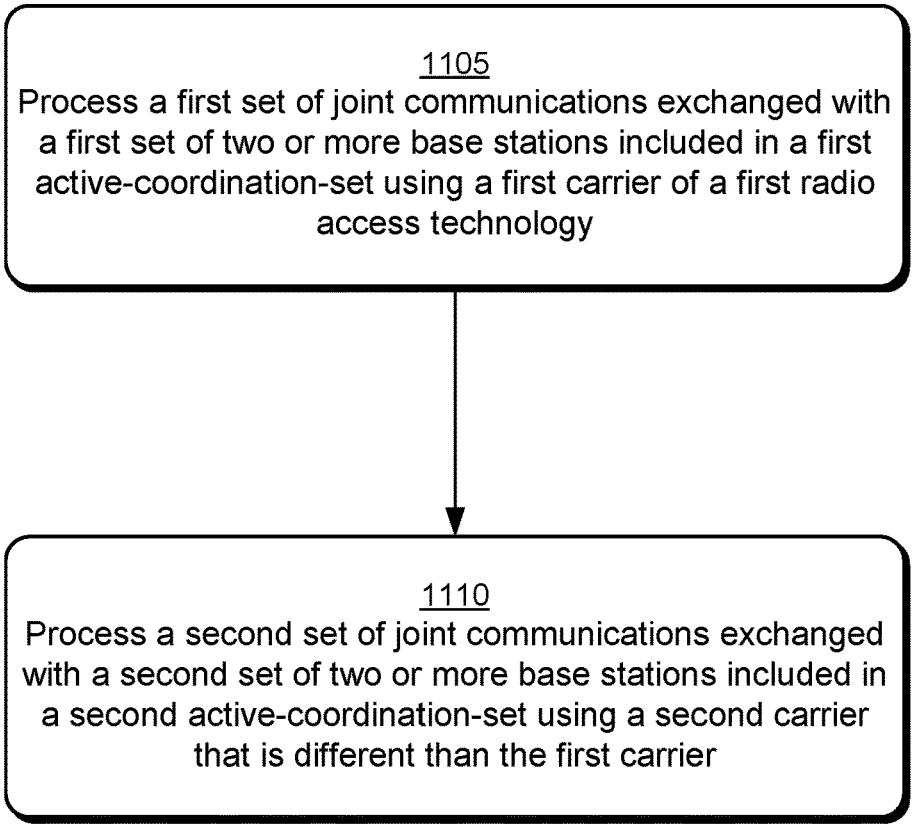
FIG. 11 illustrates an example method for implementing multiple active-coordination-set aggregation for mobility management in accordance with aspects of the techniques described herein.

FIG. 11 illustrates example method 1100 for multiple active-coordination-set aggregation for mobility management. The method 1100 may be performed by user equipment, such as UE 110 of FIG. 1, using various aspects described with respect to FIGS. 1-10.

At 1105, the user equipment (UE) processes a first set of joint communications exchanged with a first set of two or more base stations included in a first active-coordination-set (ACS) using a first carrier of a first radio access technology (RAT). The UE (e.g., UE 110), for example, processes any combination of carrier aggregation communications with the first ACS, dual connectivity communications with the first ACS, uplink-only communications with the first ACS, or downlink-only communications with the first ACS (e.g., ACS 604, ACS 604, ACS 606, ACS 702, ACS 704). Thus, in various implementations, the UE communicates with the first ACS using more than the first carrier. In implementations, processing the first set of joint communications can include any combination of sending and/or receiving the communications, encoding and/or decoding data packets, various protocol layer(s) processing, and so forth.

At 1110, the UE processes a second set of joint communications exchanged with a second set of two or more base stations included in a second ACS using a second carrier that is different than the first carrier, where the second set of joint communications are coordinated with the first set of joint communications. For example, the UE (e.g., UE 110) processes any combination of carrier aggregation communications with the second ACS, dual connectivity communications with the second ACS, uplink-only communications with the second ACS, or downlink-only communications with the second ACS (e.g., any one of ACS 604, ACS 604, ACS 606, ACS 702, or ACS 704 that is different from the first ACS). In various implementations the second ACS uses a second RAT that is different from the first RAT. In implementations, processing the second set of joint communications can include any combination of sending and/or receiving the communications, encoding and/or decoding data packets, various protocol layer(s) processing, and so forth.

In some scenarios, the second set of joint communications are coordinated with the first set of joint communications based on coordinated directional communications, such as the first set of joint communications being uplink-only transmissions and the second set of joint communications being downlink-only communications. Alternately or additionally, the second set of joint communications are coordinated with the first set of joint communications based on other forms of coordinated communications, such as carrier aggregation and/or dual connectivity.

At times, the UE processes a third set of joint communications exchanged with a third set of two or more base stations included in a third ACS using a third carrier that is different than the first carrier and the second carrier. In implementations, the UE processes the third set of joint communications as coordinated communications with the second set of joint communications and/or the first set of joint. For instance, the third set of joint communications can include joint uplink transmissions and downlink transmissions that are coordinated with the first and second joint communications.

The order in which the method blocks are described are not intended to be construed as a limitation, and any number of the described method blocks can be skipped or combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Although aspects of multiple active-coordination-set (ACS) aggregation for mobility management have been described in language specific to features and/or methods, the subject of the appended claims is not necessarily limited to the specific features or methods described. Rather, the specific features and methods are disclosed as example implementations of multiple ACS aggregation for mobility management, and other equivalent features and methods are intended to be within the scope of the appended claims. Further, various different aspects are described, and it is to be appreciated that each described aspect can be implemented independently or in connection with one or more other described aspects.

In the following, several examples are described:

Example 1: A method for implementing multiple active-coordination-set aggregation by a first master base station for mobility management of a user equipment, the method comprising the first master base station: coordinating aggregation of control-plane and user-plane communications, generated by a first active-coordination-set, for a first joint communication between the first active-coordination-set and the user equipment, the first active-coordination-set including the first master base station and at least a second base station; receiving, from a second master base station of a second active-coordination-set, control-plane information or user-plane data associated with a second joint communication between the second active-coordination-set and the user equipment, the second active-coordination-set including the second master base station and at least a third base station; and aggregating the control-plane and user-plane communications generated by the first active-coordination-set with at least a portion of the control-plane information or the user-plane data from the second master base station to coordinate data throughput to the user equipment.

Example 2: The method as recited in example 1, wherein receiving the control-plane information or user-plane data comprises: receiving the control-plane information or user-plane data at a Media Access Control layer of the first master base station.

Example 3: The method as recited in example 1 or example 2, wherein receiving the control-plane information or user-plane data comprises: receiving at least one of a layer-1 assignment, grant information, or hybrid automatic repeat request feedback for the second active-coordination-set.

Example 4: The method as recited in any one of the preceding examples, wherein receiving the control-plane information or user-plane data comprises: receiving, at a Packet Data Convergence Protocol layer of the first master base station, layer-2 control information.

Example 5: The method as recited in example 4, wherein the control-plane information or user-plane data includes layer-2 feedback corresponding to the second active-coordination-set.

Example 6: The method as recited in any one of the preceding examples, wherein receiving the control-plane information or user-plane data comprises: receiving control-plane information that includes layer-3 control information for the user equipment.

Example 7: The method as recited in example 6, wherein the layer-3 control information includes management information to manage a configuration of the first active-coordination-set or the second active-coordination-set.

Example 8: The method as recited in any one of examples 1 to 7, further comprising: receiving uplink transmissions from the user equipment; and forwarding at least a portion of the uplink transmissions to the second master base station.

Example 9: The method as recited in any one of examples 1 to 8, further comprising: selecting one of the first active-coordination-set and the second active-coordination-set for satisfying one or more quality-of-service requirements for a quality-of-service-flow; and coordinating with the second master base station to route communications associated with the quality-of-service-flow through the selected one of the first active-coordination-set and the second active-coordination-set.

Example 10: A method for multiple active-coordination-set aggregation, the method comprising a user equipment: processing a first set of joint communications exchanged with a first set of two or more base stations included in a first active-coordination-set using a first carrier frequency of a first radio access technology; and processing a second set of joint communications exchanged with a second set of two or more base stations included in a second active-coordination-set using a second carrier frequency that is different than the first carrier frequency, the second set of joint communications comprising communications that are coordinated with the first set of joint communications.

Example 11: The method as recited in example 10, wherein the second active-coordination-set uses a second radio access technology that is different than the first radio access technology.

Example 12. The method as recited in example 10 or example 11, further comprising: processing a third set of joint communications exchanged with a third set of two or more base stations included in a third active-coordination-set using a third carrier frequency that is different than the first carrier frequency and the second carrier frequency.

Example 13: The method as recited in example 12, wherein processing the first set of joint communications comprises: processing uplink-only transmissions.

Example 14: A base station apparatus comprising: at least one wireless transceiver; a processor; and computer-readable storage media comprising instructions, responsive to execution by the processor, for directing the base station apparatus to perform any one of the methods recited in examples 1 to 9 and examples 16 to 22 using the at least one wireless transceiver.

Example 15: A user equipment apparatus comprising: at least one wireless transceiver; a processor; and computer-readable storage media comprising instructions, responsive to execution by the processor, for directing the user equipment apparatus to perform any one of the methods recited in examples 10 to 13 and examples 23 to 26 using the at least one wireless transceiver.

Example 16: The method as recited in example 1, further comprising transmitting lower-layer protocol control information for the user equipment to the second master base station of the second active-coordination-set.

Example 17: The method as recited in example 1, wherein receiving the control-plane information or user-plane data comprises: receiving control-plane information that includes lower-layer protocol control information including at least one of scheduling information or hybrid automatic repeat request information for transfer to the second base station.

Example 18: The method as recited in example 1, wherein: the first active-coordination-set is configured for uplink-only transmissions for the user equipment.

Example 19: The method as recited in example 18, wherein the second active-coordination-set is configured for downlink-only transmissions for the user equipment.

Example 20: The method as recited in any one of examples 1 to 9, wherein the first active-coordination-set includes a first subset of base stations and a second subset of base stations, and aggregating the control-plane and user-plane communications generated by the first active-coordination set with at least a portion of the control-plane information or the user-plane data from the second master base station further comprises: coordinating the first subset of base stations to handle downlink aggregation of downlink-only transmissions with the user equipment; and coordinating the second subset of base stations to handle uplink aggregation of uplink-only transmissions with the user equipment.

Example 21: The method as recited in any one of examples 1 to 9 and examples 16 to 20, wherein: the first active-coordination-set is user-equipment-specific to the user equipment and carrier-specific to a first carrier frequency; and the second active-coordination-set is user-equipment-specific to the user equipment and carrier-specific to a second carrier frequency.

Example 22: The method as recited in any one of examples 1 to 9 and examples 16 to 21, wherein: the first active-coordination-set is user-equipment-specific to the user equipment and configured for a first radio access technology; and the second active-coordination-set is user-equipment-specific to the user equipment and configured for a second radio access technology that is different than the first radio access technology.

Example 23: The method as recited in example 13, wherein processing the second set of joint communications comprises: processing downlink only transmissions.

Example 24: The method as recited in example 13 or example 23, wherein processing the third set of joint communications comprises: processing uplink transmissions and downlink transmissions.

Example 25: The method as recited in example 10, wherein the communications that are coordinated comprise carrier aggregation communications.

Example 26: The method as recited in example 10, wherein the communications that are coordinated comprise dual connectivity communications.

Example 27: A computer-readable medium comprising instructions that, when executed by one or more processors, cause a device incorporating the one or more processors to perform any of the methods of examples 1 to 13 and example 16 to 26.

What is claimed is:

1. A method for implementing multiple active-coordination-set (ACS) aggregation by a first master base station of a first active-coordination-set (ACS) for mobility management of a user equipment (UE), the method comprising the first master base station:

coordinating aggregation of control-plane and user-plane communications with the UE between at least the first ACS and a second ACS by communicating with a second master base station of the second ACS, the first ACS including the first master base station and at least a second base station, the second ACS including the second master base station and at least a third base station;

communicating, jointly with at least one other base station in the first ACS, with the UE using at least one of a first coordinated multipoint joint transmission or a first coordinated multipoint joint reception between a plurality of base stations in the first ACS and the UE, the at least one of the first coordinated multipoint joint transmission or the first coordinated multipoint joint reception associated with the control-plane and user-plane communications;

receiving, from the second master base station of the second ACS, control-plane information or user-plane data that is associated with at least one of a second coordinated multipoint joint transmission or second coordinated multipoint joint reception between a plurality of base stations in the second ACS and the UE; and aggregating the control-plane and user-plane communications communicated by the first ACS with at least a portion of the control-plane information or the user-plane data from the second master base station to coordinate data throughput to the UE.

2. The method as recited in claim 1, wherein receiving the control-plane information or user-plane data comprises:
receiving the control-plane information or user-plane data at a Media Access Control layer of the first master base station.

3. The method as recited in claim 1, wherein receiving the control-plane or user-plane communications comprises:
receiving at least one of a layer-1 assignment, grant information, or hybrid automatic repeat request feedback for the second ACS.

4. The method as recited in claim 1, wherein receiving the control-plane information or user-plane data comprises:
receiving, at a Packet Data Convergence Protocol layer of the first master base station, layer-2 control information.

5. The method as recited in claim 4, wherein the control-plane information or user-plane data includes layer-2 feedback corresponding to the second ACS.

6. The method as recited in claim 1, wherein receiving the control-plane information or user-plane data comprises:
receiving control-plane information that includes layer-3 control information for the user equipment.

7. The method as recited in claim 6, wherein the layer-3 control information includes management information to manage a configuration of the first ACS or the second ACS.

8. The method as recited in claim 1, further comprising:
receiving uplink transmissions from the user equipment; and
forwarding at least a portion of the uplink transmissions to the second master base station.

9. The method as recited in claim 1, further comprising:
selecting one of the first ACS and the second ACS for satisfying one or more quality-of-service (QOS) requirements for a QoS-flow; and
coordinating with the second master base station to route communications associated with the QoS-flow through the selected one of the first ACS and the second ACS.

10. The method as recited in claim 1, further comprising:
transmitting lower-layer protocol control information for the user equipment to the second master base station of the second ACS.

11. The method as recited in claim 1, wherein receiving the control-plane information or user-plane data comprises:
receiving control-plane information that includes lower-layer protocol control information including at least one of scheduling information or hybrid automatic repeat request information for transfer to the second base station.

12. A base station apparatus comprising:
at least one wireless transceiver;
a processor; and
computer-readable storage media comprising instructions that, responsive to execution by the processor, direct the base station apparatus to perform operations using the at least one wireless transceiver, the operations comprising:
coordinating aggregation of control-plane and user-plane communications with a user equipment (UE) between at least a first active-coordination-set (ACS) and a second ACS by communicating with a second master base station of the second ACS, the first ACS including the base station apparatus acting as a first master base station and at least a second base station, the second ACS including the second master base station and at least a third base station;
communicating, jointly with at least one other base station in the first ACS, with the UE using at least one of a first coordinated multipoint joint transmission or a first coordinated multipoint joint reception between a plurality of base stations in the first ACS and the UE, the at least one of the first coordinated multipoint joint transmission or the first coordinated multipoint joint reception associated with at least a portion of the control-plane and user-plane communications;
receiving, from the second master base station of the second ACS, control-plane information or user-plane data that is associated with at least one of a second coordinated multipoint joint transmission or second coordinated multipoint joint reception between a plurality of base stations in the second ACS and the user equipment; and
aggregating the control-plane and user-plane communications communicated by the first ACS with at least a portion of the control-plane information or the user-plane data from the second master base station to coordinate data throughput to the user equipment.

13. The base station apparatus as recited in claim 12, wherein the computer-readable storage media comprises instructions that, responsive to execution by the processor, direct the base station apparatus to receive the control-plane information or user-plane data by:
receiving the control-plane information or user-plane data at a Media Access Control layer of the first master base station.

14. The base station apparatus as recited in claim 12, wherein the computer-readable storage media comprises instructions that, responsive to execution by the processor, direct the base station apparatus to receive the control-plane information or user-plane data by:
receiving at least one of a layer-1 assignment, grant information, or hybrid automatic repeat request feedback for the second ACS.

15. The base station apparatus as recited in claim 12, wherein the computer-readable storage media comprises instructions that, responsive to execution by the processor, direct the base station apparatus to receive the control-plane information or user-plane data by:
receiving, at a Packet Data Convergence Protocol layer of the first master base station, layer-2 control information.

16. The base station apparatus as recited in claim 15, wherein the control-plane information or user-plane data includes layer-2 feedback corresponding to the second ACS.

17. The base station apparatus as recited in claim 12, wherein the computer-readable storage media comprises instructions that, responsive to execution by the processor, direct the base station apparatus to receive the control-plane information or user-plane data by:
receiving control-plane information that includes layer-3 control information for the user equipment.

18. The base station apparatus as recited in claim 17, wherein the layer-3 control information includes management information to manage a configuration of the first ACS or the second ACS.

19. The base station apparatus as recited in claim 12, wherein the computer-readable storage media comprises instructions that, responsive to execution by the processor, direct the base station apparatus to perform additional operations comprising:
receiving uplink transmissions from the user equipment; and
forwarding at least a portion of the uplink transmissions to the second master base station.

20. The base station apparatus as recited in claim 12, wherein the computer-readable storage media comprises instructions that, responsive to execution by the processor, direct the base station apparatus to perform additional operations comprising:
selecting one of the first ACS and the second ACS for satisfying one or more quality-of-service (QOS) requirements for a QoS-flow; and
coordinating with the second master base station to route communications associated with the QoS-flow through the selected one of the first ACS and the second ACS.

* * * * *